United States Patent
Tan et al.

(10) Patent No.: US 7,715,084 B2
(45) Date of Patent: May 11, 2010

(54) RETARDER-BASED DESPECKLE DEVICE FOR LASER ILLUMINATION SYSTEMS

(75) Inventors: Kim L. Tan, Santa Rosa, CA (US);
David M. Shemo, Windsor, CA (US);
Scott McEldowney, Windsor, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 12/424,168

(22) Filed: Apr. 15, 2009

(65) Prior Publication Data

US 2009/0257106 A1    Oct. 15, 2009

Related U.S. Application Data

(60) Provisional application No. 61/045,012, filed on Apr. 15, 2008.

(51) Int. Cl.
*G02F 1/01* (2006.01)
*H01S 3/10* (2006.01)

(52) U.S. Cl. ............................ 359/279; 359/900; 372/9

(58) Field of Classification Search ................ 359/238, 359/259, 279, 316, 900; 372/9, 26; 362/268
See application file for complete search history.

(56) References Cited

U.S. PATENT DOCUMENTS

| | | | | |
|---|---|---|---|---|
| 3,633,999 | A | 1/1972 | Buckles | 359/577 |
| 4,511,220 | A | 4/1985 | Scully | 359/495 |
| 6,323,984 | B1 | 11/2001 | Trisnadi | 359/245 |
| 6,577,429 | B1 | 6/2003 | Kurtz et al. | 359/279 |
| 6,747,781 | B2 | 6/2004 | Trisnadi | 359/279 |
| 7,342,719 | B1 | 3/2008 | Kalmanash et al. | 359/452 |
| 2004/0008399 | A1 | 1/2004 | Trisnadi | 359/279 |
| 2006/0012842 | A1 | 1/2006 | Abu-Ageel | 385/146 |
| 2006/0023164 | A1 | 2/2006 | Sakaguchi et al. | 353/20 |
| 2007/0223091 | A1 | 9/2007 | Lee | 359/494 |
| 2008/0049284 | A1 | 2/2008 | Park et al. | 359/196.1 |
| 2008/0106779 | A1 | 5/2008 | Peterson et al. | 359/259 |

(Continued)

FOREIGN PATENT DOCUMENTS

WO    00/62114    10/2000

OTHER PUBLICATIONS

Wang et al., Speckle reduction in laser projection systems by diffractive optical element, Appl. Opt. 37, pp. 1770-1775, 1998.

(Continued)

*Primary Examiner*—Jack Dinh
(74) *Attorney, Agent, or Firm*—Matthew A. Pequignot; Pequignot + Myers LLC

(57) ABSTRACT

A method and apparatus for reducing speckle in a laser illumination system uses a despeckle device including an optical retarder providing an odd integer multiple of substantially half-wave retardation for light emitted from a coherent laser in the laser illumination system. The near half-wave optical retarder has a substantially constant retardance and a spatially varied slow axis. The spatially varied slow axis imposes a phase mask on the beam of light, which provides sub-resolution optical phase modulation to a resolution spot on the detector. The near half-wave optical retarder is actuated mechanically or electrically to vary the sub-resolution optical phase modulation within an integration time of the detector.

20 Claims, 31 Drawing Sheets

U.S. PATENT DOCUMENTS

2008/0212034 A1   9/2008   Aksyuk et al. ............... 353/20

OTHER PUBLICATIONS

Trisnadi, "Speckle contrast reduction in laser projection displays," in Projection Displays VIII, Proc. SPIE 4657, M H Wu, Editor (Soc. Photo-Opt. Instru. Engrs., Bellingham, WA, 2002), pp. 131-137.

M.V. Berry, Proc. R. Soc. Lond. A, 392, pp. 15-43, 1984.

M.V. Berry, "The adiabatic phase and Pancharatnam's phase for polarized light," J. Mod. Opt. pp. 1401-1407, vol. 34, 1987.

R. Bhandari, Phys. Lett. A, p. 469, vol. 138, 1989.

E.J. Galvez, Recent Research Developments in Optics 2, 165-182, 2002.

S. C. McEldowney, D. M. Shemo, R. A. Chipman, and P. K. Smith, "Creating vortex retarders using photoaligned liquid crystal polymers," Opt. Lett. 33, 134-136, 2008.

J. W. Goodman, "Some fundamental properties of speckles," J. Opt. Soc. Amer. A, 66, pp. 1145-1150, 1976.

L. Wang et al, "Speckle reduction in laser projections with ultrasonic waves", Opt. Eng. 39(6), 1659-1664, 2000.

EP Search Report for EP 09157801, Jul. 23, 2009.

RETARDER-BASED DESPECKLE DEVICE FOR LASER ILLUMINATION SYSTEMS

CROSS-REFERENCE TO RELATED APPLICATIONS

This application claims priority from U.S. Provisional Application No. 61/045,012, filed Apr. 15, 2008, which is hereby incorporated by reference for all purposes.

TECHNICAL FIELD

The present application relates generally to speckle reduction, and in particular, to a retarder-based method and apparatus for reducing speckle in laser illumination systems.

BACKGROUND OF THE INVENTION

Laser illumination systems are commonly used in projection displays to provide high power illumination and saturated color. However, while lasers provide bright images with good color, the image quality can be degraded due to speckle.

Speckle arises when coherent light is reflected from a rough or dusty surface, or propagates through a medium with random refractive index variations. More specifically, it arises when the reflected light, which includes multiple beams with differential delays greater than the wavelength of light, interfere at the detector (e.g. human eye, or square law photodetector). This interference provides an uneven, random, fluctuation of light intensity commonly referred to as a speckle pattern.

In projection displays, speckle generally originates when the light reflects off of the display screen, which typically has a surface roughness greater than one quarter of the wavelength of the laser light. The resulting random spatial interference of the reflected laser light produces a speckle pattern that significantly degrades the quality of the image (e.g., making it appear grainy and/or less sharp). In addition, depending on the view point, the speckle pattern may change due to the different characteristics of relative phase delays in a given direction. As a result, the image being observed changes with view point and the optical system fails to reliably recreate a high fidelity image.

Speckle is typically quantified by the speckle contrast. The prior art describes various techniques for reducing speckle and/or reducing the speckle contrast. For example, one approach has been to increase the number of longitudinal modes of the laser such that speckle patterns from multiple wavelengths average to a smooth profile. Another approach has been to tile an array of coherent laser diodes (LD) to provide spatially incoherent illumination. Unfortunately, this approach is expensive, and is not always practical, since many miniature projectors rely on a single LD chip to output tens of lumens illumination. Yet another approach has been to create polarization diversity in the laser illumination. For example, one laser beam can be split into two polarizations, with the first polarization being allowed through a polarization beam splitter (PBS) and the second polarization delayed by greater than the coherence length of the laser (e.g., see U.S. Pat. Nos. 3,633,999 and 4,511,220). Generally, this approach is bulky and has limited speckle contrast reduction. In addition, it is not ideal if the laser coherence length is very long.

In addition to changing the LD arrangement (spatial) or manipulating the laser device characteristics (polarization and longitudinal modes) to reduce the spatial and temporal coherence of the laser beam, another approach has been to create many varied boiling speckle patterns that allow for temporal averaging (e.g., by the human eye or photodetector) to reduce intensity non-uniformity. For example, one approach is to vibrate the display screen. Unfortunately, for a large projection screen, this is not very practical. Accordingly, the more common approach is to use an external optical element, such as a diffuser (e.g., see J. W. Goodman et al., "Speckle reduction by a moving diffuser in laser projection displays," Annual Meeting of the Optical Society of America, Rhode Island, 2000), a phase plate (e.g., see U.S. Pat. Nos. 6,323,984 and 6,747,781), or a random diffractive optical element (e.g., see L. Wang et al., Speckle reduction in laser projection systems by diffractive optical element," Appl. Opt. 37, pp. 177-1775, 1998), which is vibrated or spun to yield multiple phase delays over time. In another approach, an ultrasonic modulator is used to shift the interference fringes.

While the more commonly used methods of creating many varied boiling speckle patterns to provide temporal averaging have been reasonably successful at reducing spectral contrast, they have been generally limited by the surface pattern physically etched/embossed in prior art diffusers/phase plates. For example, these raised surface patterns have been shown to significantly degrade the quality of the laser beam.

SUMMARY OF THE INVENTION

The instant invention relates to a method of creating many varied boiling speckle patterns using an actuatable waveplate element. In one embodiment, the boiling speckle patterns are presented to a detector (e.g., human eye, photodetector) at the image plane over time, along with the static/variable speckle patterns resulting from index inhomogeneity of optical elements and/or projection screen roughness. These uncorrelated or partially correlated speckle patterns are incoherently summed over the detector integration interval (e.g., are temporally averaged). This temporally averaged speckle pattern reduces the speckle contrast by reducing the deviation of any observation pixel from the required image intensity in the absence of speckle.

The actuatable waveplate element produces the varied speckle patterns by providing a variable phase modulation generated by the mechanical agitation and/or electronic switching of a near half-wave optical retarder. More specifically, the mechanical agitation and/or electronic switching of the near half-wave optical retarder, which has a spatially varied slow axis, introduces a geometric phase shift for different regions of the laser beam.

According to one embodiment, the actuatable waveplate element is a waveplate assembly including two or more stages. In the first-stage, a single-layer quarter-waveplate (QWP) or a multiple-layer achromatic (A) QWP is oriented such that it's optic axis (also slow-axis, SA) is aligned at $\pm\pi/4$ (45 degrees) azimuthal angle offset to the polarized light output from the laser source. As a result, the linearly polarized light output from the laser is converted from a first linear polarization to a first handedness of circular polarization. In the second stage, a near half-waveplate (HWP) element converts the first circular polarization (i.e., having the first handedness) to a second circular polarization (i.e., having a second opposite handedness). The near HWP has a varied slow axis distribution (e.g., the slow axis orientation varies across the plane of the optical retarder in a predetermined or random pattern). In a third optional stage, a second QWP or AQWP converts the second circular polarization to a second linear polarization. If the retarder axes of the first stage and the third stage QWPs are aligned parallel, the second linear polarization is parallel to the first linear polarization. If however, the two QWP stages are aligned with crossed axes, the first and the second linear polarizations are orthogonal. If the third stage QWP is omitted, circular polarization is output and passed to the appropriate optical modulator (e.g., having a plurality of micromirrors). Notably, this polarization transformation forms a closed loop locus on the Poincare Sphere to induce a geometric phase shift dependent on the optic axis orientation of the second stage near HWP. Since the near HWP includes a varied optic axis distribution, this waveplate assembly functions as a despeckle device, which imposes a spatially and/or temporally varied phase mask upon the coherent laser beam, thus reducing the perceived speckle, while still maintaining a high degree of input power in the required output polarization state.

In accordance with one aspect of the instant invention there is provided a method of reducing speckle in a laser illumination system comprising: inserting a despeckle device in a beam of light, the beam of light including light emitted from a coherent laser in the laser illumination system, the despeckle device including an optical retarder for providing an odd integer multiple of substantially half-wave retardation for the light emitted from the coherent laser, the optical retarder having a substantially constant retardance and a spatially varied slow axis, the spatially varied slow axis for imposing a phase mask on the beam of light, the phase mask for providing sub-resolution optical phase modulation to a resolution spot on a detector; and actuating the optical retarder such that the sub-resolution optical phase modulation is varied within an integration time of the detector and such that an intensity non-uniformity of one detected resolution spot to another is reduced.

In accordance with another aspect of the instant invention there is provided an apparatus for reducing speckle in a laser illumination system comprising: a despeckle device including an optical retarder for providing an odd integer multiple of substantially half-wave retardation for light emitted from a coherent laser in the laser illumination system, the optical retarder having a substantially constant retardance and a spatially varied slow axis, the spatially varied slow axis for imposing a phase mask on a beam of light, the beam of light including the light emitted from the coherent laser, the phase mask for providing sub-resolution optical phase modulation to a resolution spot on a detector; and an actuator for actuating the optical retarder such that the sub-resolution optical phase modulation is varied within an integration time of the detector and such that an intensity non-uniformity of one detected resolution spot to another is reduced.

BRIEF DESCRIPTION OF THE DRAWINGS

Further features and advantages of the present invention will become apparent from the following detailed description, taken in combination with the appended drawings, in which:

FIG. 20(c) is a schematic diagram of a despeckle device according to one embodiment of the instant invention, including an electrically switchable HWP;

FIG. 20(d) is an exploded view of the despeckle device illustrated in FIG. 20(c) showing the slow axis orientations of the electrically switchable HWP (substrates are omitted for clarity);

It will be noted that throughout the appended drawings, like features are identified by like reference numerals.

DETAILED DESCRIPTION

Figure 1:
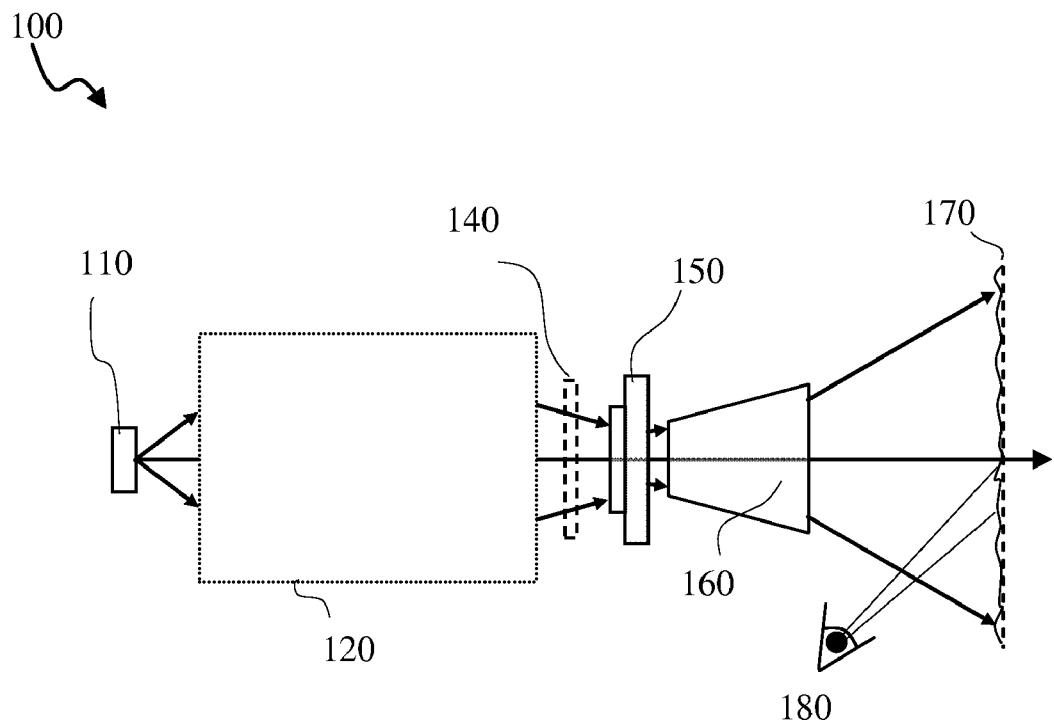
FIG. 1 is a schematic diagram of a laser-based projection display incorporating a despeckle device.

A laser-based projector (PJ) system is illustrated in FIG. 1. In this system 100, the output light from the light source 110 is homogenized and shaped by optical elements 120 in order to form a rectangle of uniform illumination at the required aspect ratio on the display panel 150. In this embodiment, the light source 110 includes one co-packaged Red, Green and Blue (RGB) laser diode (LD) module. In other embodiments, the light source includes three discretely coupled RGB LDs. The beam shaping optics 120, which in one embodiment include a high performance lightpipe, collimation lenses, or fly's eye array, will also typically include polarization conversion and/or recovery optics if the display panel 150 uses polarization modulation (e.g., liquid crystal based display). In other embodiments (e.g., for space-constrained nano/pico-projectors), the beam shaping optics 120 includes a combination of diffractive/refractive flat optics used to homogenize and shape the rectangle in the illumination arm. In this embodiment, the display panel 150 is illustrated as a transmissive display panel (e.g., a twisted nematic (TN) LCD panel). In other embodiments, the display panel 150 is reflective (e.g., a digital micro-mirror (DMD) or Liquid Crystal on Silicon (LCoS) panel). In embodiments using a reflective display panel, a polarization beam splitter (PBS) is typically provided to separate the illumination and projection optical trains. The projection optics 160 typically include a projection lens, which projects the modulated light onto the display screen 170. The light reflected from the display screen 170 is observed at the detector 180.

As discussed above, the inherent coherence of the light source 110, the index inhomogeneity of various optical components 120, and/or the roughness of the display screen 170, induces a random phase fluctuation that causes light interference, which manifests as bright and dark image spots to the observer. This spot-to-spot intensity fluctuation (e.g., the speckle pattern) has a characteristic granular size that is the same as the size of the detector 180 resolution spot. The speckle pattern makes the image quality unacceptable for most imaging applications.

Accordingly, a despeckle device 140 is inserted in the optical path to eliminate or reduce speckle noise. In this embodiment, the despeckle device 140 is located in the illumination arm of the display system (e.g., between the light source 110 and the display panel 150) so as not to degrade the optical system modulation transfer function due to undesirable scattering and/or depolarization of the despeckle device. In other embodiments, the despeckle device 140 is inserted in the projection arm of the display system (e.g. between the display panel 150 and the projection screen 170).

The despeckle device 140 reduces speckle noise by producing multiple speckle patterns that are averaged with the static speckle patterns produced by the index inhomogeneity of various optical components and/or roughness of the display screen, over one detection interval of the human eye or electronic detector 180. While the despeckle device 140 does not reduce the coherence of the laser light source, it does reduce the perceived effects of speckle patterns and/or reduce the speckle contrast.

The method of producing multiple speckle patterns to reduce speckle contrast has been studied for prior art despeckle devices that use active diffusers/variable phase plates having textured surfaces. According to J. W. Goodman, "Some fundamental properties of speckles," J. Opt. Soc. Amer. A, 66, pp. 1145-1150, 1976, the speckle contrast ratio of laser illumination can be reduced by superimposing N uncorrelated speckle patterns. The speckle contrast ratio is defined as the root mean square (rms) intensity deviation of the non-uniform image as a ratio to the mean/average image intensity envelope. The reduction is a factor of $\sqrt{N}$ for a complete decorrelation set. The uncorrelated speckle patterns can be obtained from time, space, frequency (wavelength) and polarization. If the N sets of speckle patterns are not uncorrelated, the reduction factor is less.

Figure 2:
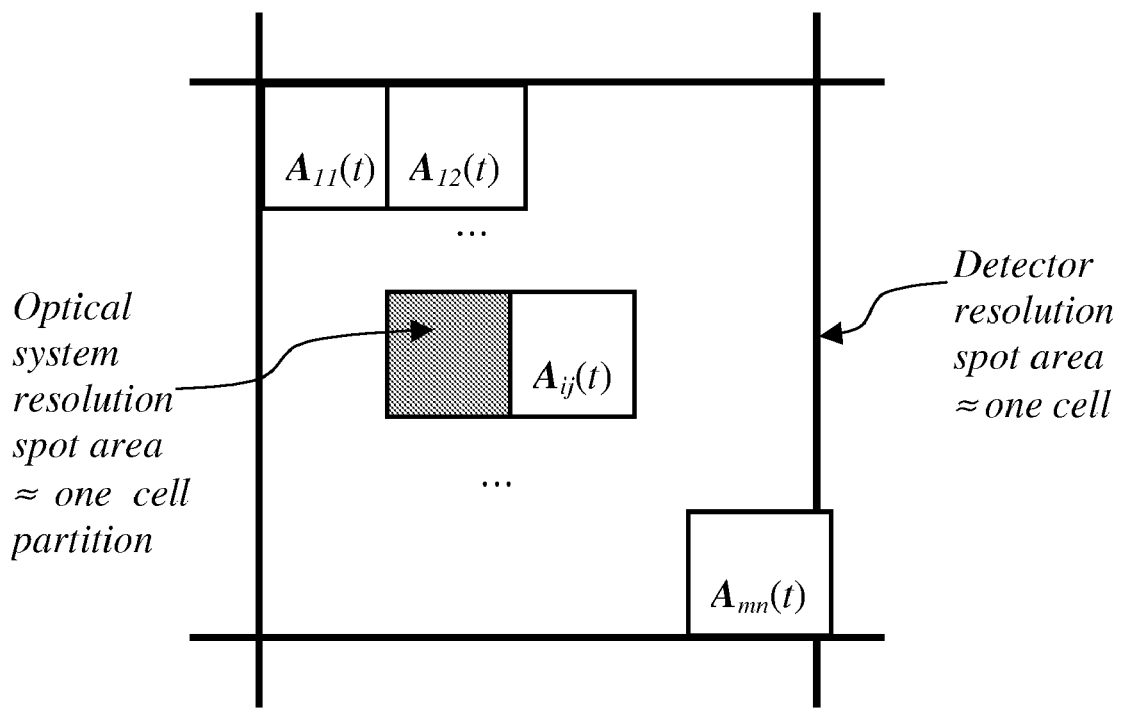
FIG. 2 is a schematic diagram of a cell within the resolution spot of the detector, showing cell partitions having varied phase values.

According to J. I. Trisnadi, "Speckle contrast reduction in laser projection displays," in Projection Displays VIII, Proc. SPIE 4657, M H Wu, Editor (Soc. Photo-Opt. Instru. Engrs., Bellingham, Wash., 2002), pp. 131-137, one approach to reducing speckle contrast is to make a cell corresponding to the resolution spot of the intensity detector (i.e., human eye or electronic photodetectors) into multiple cell partitions, and applying a temporal phase variation to the cell partitions. A schematic diagram of a cell within the resolution spot of the detector is shown in FIG. 2.

In U.S. Pat. No. 6,747,781, Trisnadi teaches that optimal speckle contrast reduction requires that the cross terms of the coherent summation of optical fields at the detector have to be eliminated. For example, if the active diffuser/phase plate contain cells divided into 2×2 partitions, the original unchanged detected intensity is given by, $$S_0 = |A_{11} + A_{12} + A_{21} + A_{22}|^2 \quad (1)$$
$$= |A_{11}|^2 + |A_{12}|^2 + |A_{21}|^2 + |A_{22}|^2 +$$
$$2A_{11}A_{12} + 2A_{11}A_{21} + 2A_{11}A_{22} +$$
$$2A_{12}A_{21} + 2A_{12}A_{22} + 2A_{21}A_{22},$$

where $A_{ij}$ are complex amplitude transmission or reflection of the individual cell partitions within a cell of the active diffuser. A single cell of the active diffuser corresponds to the detector resolution spot size. Herein, the term active diffuser is used interchangeably with active phase plate. The active diffuser is active in the sense that its property has to be changed over the detector integration interval.

The cross terms (i.e., the product of complex amplitudes of two or more cell partitions) have been shown to be eliminated if the 2×2 cell is configured as a Hadamard 2×2 matrix and is translated through 4 sub-intervals of the detector integration time. The desired illumination outcome is then given by, $$S_5 = |A_{11}|^2 + |A_{12}|^2 + |A_{21}|^2 + |A_{22}|^2. \quad (2)$$

Accordingly, the detectable intensity arriving at any rough surface or any index modulated optical component is a mere incoherent sum of the individual cell partition intensities. The coherent interference resulting in speckle does not occur.

In the above described approach, Hadamard matrices of substantially equal transmission and 0 and π phase changes at sub resolution spot level are used. The larger the dimension of Hadamard matrix, the higher the gain of speckle contrast reduction. However, having to rely on an etched surface relief structure to provide for the 0 and π phase mask limits the achievable size of the cell partition. In addition, it is difficult to strictly enforce an equal sampling interval of each phase partition corresponding to a segment of resolution spot due to the small lateral translation requirements. For example, if the microdisplay panel has about 10 µm pixel pitch, a 2×2 partition requires precise translation of each 2.5×2.5 µm phase partition into a segment of the microdisplay pixel for ¼ of the detector integration interval.

In accordance with one embodiment of the instant invention, the despeckle device 140 is retarder-based. The retarder-based despeckle device 140 reduces the contributions of the cross terms in the detector by providing varying amounts of optical phase shift at individual cell partitions (or more generally each XY site of the illumination cross-section), while keeping the amplitude of optical fields constant over time and/or space domains.

In general, the retarder-based despeckle device 140 produces the varying amounts of optical phase shift using an optical retarder having a spatially varied slow axis. In one embodiment, the optical retarder having a spatially varied slow axis is moved (e.g., vibrated or spun) over detection integration time to alter the wavefront transmitted through each cell partition (or more generally each XY site of the illumination cross-section) such that phase modulation is presented to the detector at sub-resolution spots. In another embodiment, the optical retarder having spatially varied slow axis is electronically actuated to provide the phase modulation. In these embodiments, the retarder-based despeckle device 140 provides the optical phase shift via a polarization transformation provided by one or more optical retarders (i.e., including the optical retarder having spatially varied slow axis orientations).

Advantageously, since the optical phase shift is provided by an optical retarder, rather than a textured surface, the quality of the laser beam in maintained. In addition, in embodiments wherein the spatially varied axis orientations of the optical retarder are varied in a continuous manner, an increased number of phase masks can be provided to the detector, thus allowing pseudo-random phase encoding. In this case, the despeckle device 140 is not limited by the phase partition alignment versus resolution spot restriction experienced by prior art diffusers/phase plates having a textured surface.

Figure 3:
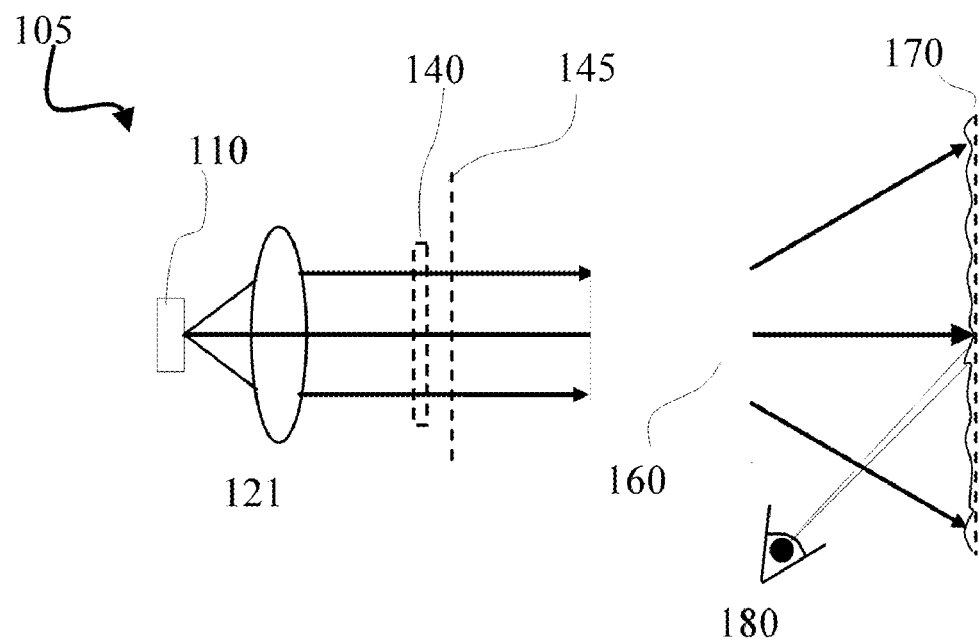
FIG. 3 is a schematic diagram of a baseline projection system.

The function of the retarder based despeckling device is described with further reference to FIG. 3, which illustrates a baseline projector system 105. In this baseline system, the beam shaping optics have been illustrated as an ideal lens 121, and the display panel 150 has been omitted, since the additional pixel by pixel optical modulation adds complexity to the 2D detected image.

The laser light source 110 emits a series of differently angled rays, each of which is coherent (i.e., in-phase and has the same optical frequency). The lens 121 collimates a single point source from the laser source 110 to a flat phase plane 145. More specifically, the lens 121 throws the focal position behind its position at some predetermined distance, creating a collimated beam waist at the flat phase plane 145. All the wavefronts across this flat phase plane arrive in phase with each other. It is illumination from this flat phase plane that is projected onto the screen 170, where it is modulated by the rough surface of the screen. Accordingly, an observer 180 sees a non-uniform intensity distribution (e.g., the speckle pattern) due to the interference of multiple light rays taking different optical path lengths and arriving at any given detector pixel (here, detector pixel is used interchangeably with the resolution spot of the eye).

Figure 4A:
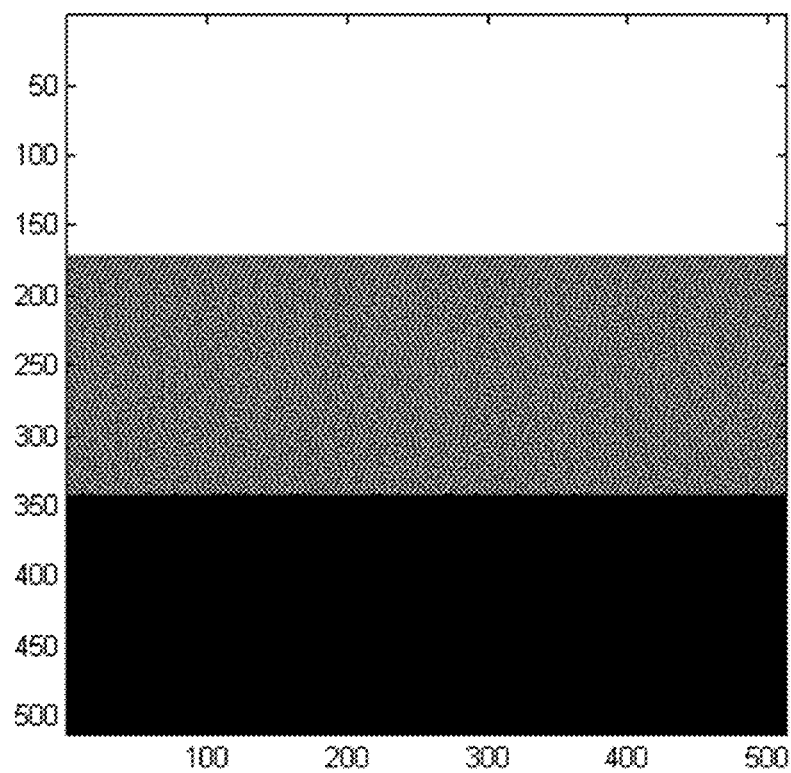
FIG. 4(a) shows an example of an object intensity map with three levels of modulation.
Figure 4B:
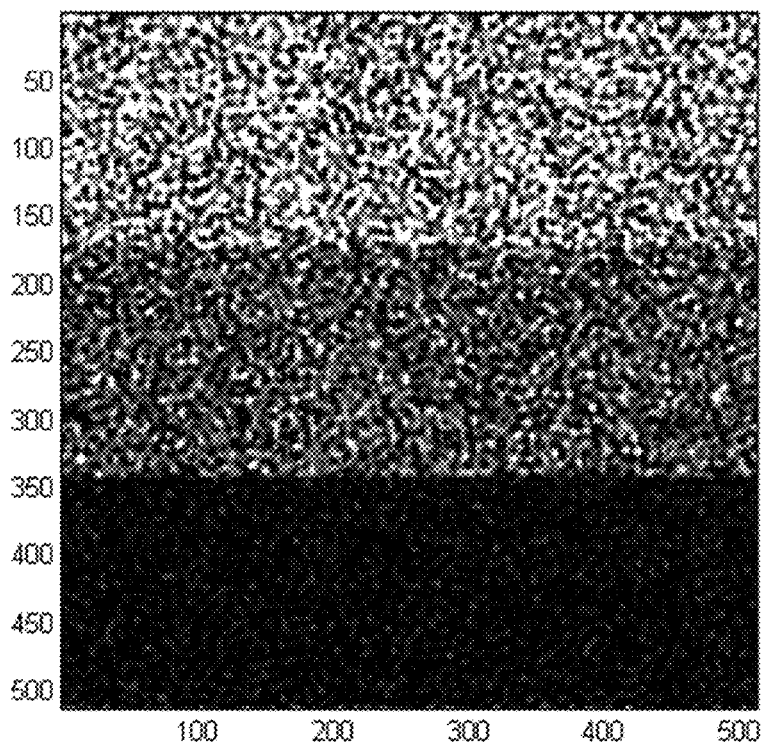
FIG. 4(b) shows an example of a detected intensity image wherein speckles due to random phase modulation up to ±π are applied to the object wavefronts.

FIGS. 4(a) and 4(b) illustrate the effects of speckle on an image. FIG. 4(a) shows an object represented as a three-zone (e.g., 0.1, 0.5 and 1 unit) intensity map. FIG. 4(b) shows an image of the same object, degraded with a simulated speckle pattern. In the simulation, the imaging system was modeled to include a normally distributed random phase distribution of up to ±π, generated over a 512×512 calculation grid. The model assumes transmission through a surface that creates the random phase distribution. The surface is representative of all sources of speckle in the projector system, a large portion of which arises from the surface roughness of the display screen. The object wavefront and the wavefront due to the speckle source are multiplied in complex amplitude space and propagated forward. This propagated field is then multiplied by a circular aperture to create the field at the exit pupil of the imaging system. The image plane distribution is a Fourier Transform pair with the exit pupil distribution and is calculated numerically. At the detector plane, the non-uniform image is obtained due to constructive and destructive interference of multiple ray paths. Note that this calculation produced a speckle ratio of over 50%. Some of the detector pixels are much brighter, while other detector pixels are much dimmer than the average image brightness.

The retarder-based despeckle device 140 generates a series of speckle patterns by a series of spatial and/or temporal changes to the despeckle device. These speckle patterns, which are uncorrelated to the speckle patterns resulting from the other optics (i.e., other than the despeckle device), are transmitted to the detector 180 with the speckle patterns generated by the other optics, within one integration interval, in order to reduce the amount of perceived speckle. The series of speckle patterns generated by the despeckle device 140 can be simulated with a model that provides a series of phase modulations over the detector 180 integration interval. At the display screen 170, the phase modulation of the despeckle device 140 is multiplied by the phase map of the original speckle. The resultant wavefront is then propagated to the detector plane. This creates a series of boiling speckle patterns which the eye (or detector) fuses over the integration interval. In this simulation, a 1:1 imaging magnification is assumed. In addition, the phase masks due to the despeckle device and the projection screen are assumed to be intrinsically lossless (i.e., pure phase modulation giving one unit complex amplitude field), such that the resultant wavefront has a phase modulation which is the sum of the two constituent phase maps.

In a simplistic analysis, the instantaneous detected intensity within a given resolution spot is the coherent sum of all complex amplitude rays falling onto the detector. The coherent sum gives rise to instantaneous image intensity at each detector pixel. Over the detector integration interval, the perceived image intensity is the incoherent average of all these images. The averaged intensity over $\Delta t$ interval is, $$S_0 = \frac{1}{\Delta t} \sum_{t}^{t+\Delta t} \left| \sum_{i,j} A_{ij}(x, y; t) \right|^2, \tag{3}$$

where $$A_{ij}(x, y; t) = B\exp[j\phi_{ij}(x, y; t)], \tag{4}$$

is the instantaneous complex amplitude of the (i,j) optical stream with a constant B amplitude and $\phi_{ij}$ instantaneous phase terms; the phase term is in general (x,y) dependent and/or can be varied over time; $\Delta t$ is the detector integration time. For the human eye, the integration time is about 20 ms (i.e., 50 frames per second).

Figure 5:
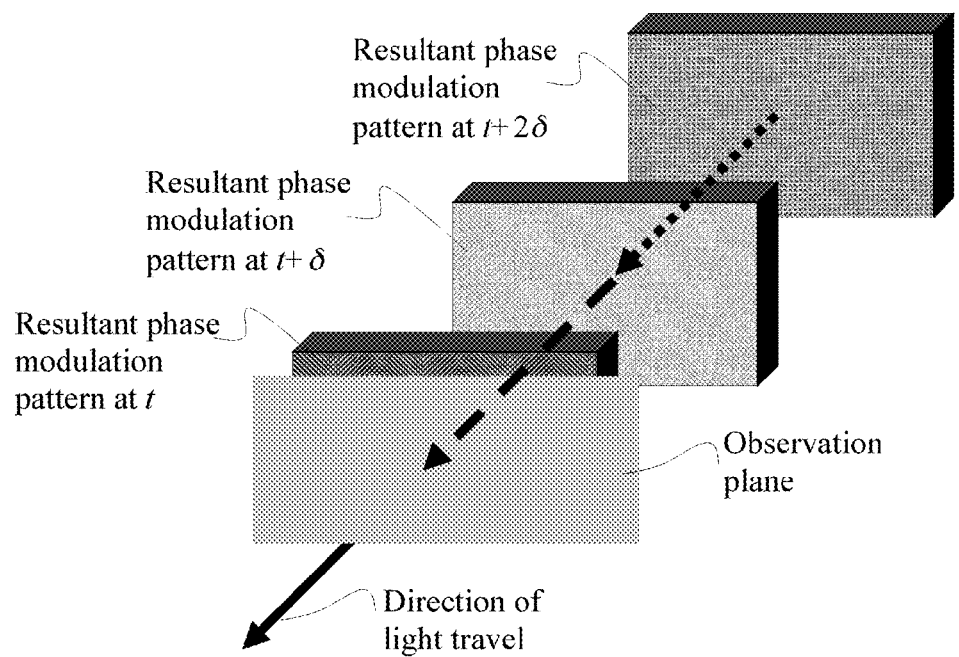
FIG. 5 is a schematic diagram showing the creation of boiling speckle patterns to average out intensity variations.

In essence, the detector 180 is presented with a series of intensity images, which arise from the complex amplitude multiplication of the phase masks provided by the despeckle device 140 and the projection screen optical path length modulation. Each constituent image within the detector integration time is a speckle pattern. These are integrated by the observer, as shown in FIG. 5. Notably, the non-uniform intensity image (e.g., speckle) will appear to be the most reduced if the speckle generated by despeckle device corresponds to uncorrelated images. Since, the source of system speckle (e.g., arising from the display screen) is static, it is preferable for the despeckle device to vary the speckle images over the detector integration time.

According to one embodiment of the instant invention, the despeckle device 140 produces a series of phase modulations to generate the series of uncorrelated speckle patterns using optical path geometry modulation. In general, a phase shift can be created using optical path length modulation or optical path geometry modulation. The former is a familiar technique, which typically involves changing the index or refraction or the physical thickness, in order to vary the optical path length. The latter is less common. It relies on having the same optical path length, but varying the geometry of the path. Geometric phase is a generic term given to the phase shift acquired when quantum states are subjected to closed loop adiabatic processes in either parameter space or state space.

In optics, this phenomenon applies to at least two important cases: spin-redirection phase shift of circular polarization photon transport along a helical path and Pancharatnam phase of polarization transformation along a closed loop. The former uses a spinor of one unit spin whereas the latter maps the polarization transformation on the Poincare Sphere (PS) having a spin unit of half. As a result, the spin-direction induces a geometric phase shift corresponding to the size of solid angle enclosed and the closed loop polarization transformation only yields half the geometric phase shift of the size of solid angle enclosed.

For example, consider a linear horizontal polarization that is transformed by at least two linear retarder elements such that the final polarization is again horizontal (e.g., a system that includes intermediate linear polarization states aligned at $\pi/3$ and $2\pi/3$). With three points on the PS globe, a geodesic triangle can be formed by joining points along the surface of the sphere along the shortest route. The solid angle subtended by this geodesic loop is then $2\pi$ (half of the $4\pi$ solid angle of a sphere). Following this, the geometric phase shift is $\pi$ (half of the solid angle in the case of Pancharatnam phase). If a reference beam having a linear horizontal polarization is brought to interfere with another beam that is also polarized horizontally, but has acquired the $\pi$ phase shift through polarization transformation, the two beams provide for destructive interference.

In the phase convention adopted here, the temporal disturbance to the optical field E has a positive sign and the spatial disturbance has a negative sign, $$E(t,z) = ReA\exp[j(\omega t - kz)] \tag{5}$$

The above includes the assumption that light is incident at normal angle on an isotropic-only film. Off-normal and birefringent layers can be treated in matrix methods. For the purpose of defining a phase convention, the two orthogonal linear field components are given by, $$E_x = A_x \cos(\omega t - kz)$$

$$E_y = A_y \cos(\omega t - kz + \alpha) \tag{6}$$

where the ratio of amplitudes and phase differences are, $$\tan(\beta) = \frac{A_y}{A_x} \tag{7}$$

$$\alpha = \phi(E_y) - \phi(E_x),$$

respectively. The ranges of these angles are:

$$0 \leq \beta \leq \pi/2 \text{ and } -\pi \leq \alpha \leq \pi. \tag{8}$$

The combination of ($\beta$, $\alpha$) allows for a general elliptically polarized plane wave to be described. By dropping the implicit temporal and spatial phase dependence, the polarization vector can be written in a more concise form, $$E = \begin{bmatrix} \cos(\beta) \\ \sin(\beta)\exp(j\alpha) \end{bmatrix} \tag{9}$$

$$= \begin{bmatrix} A_x \\ A_y e^{j\alpha} \end{bmatrix}.$$

The orientation angle of the major axis of the polarization ellipse, $\gamma$, and its ellipticity angle, $\chi$, are also readily obtained from Jones vector ($\beta$, $\alpha$) angle quantities, $$\tan(2\gamma) = \frac{2\tan(\beta)\cos(\alpha)}{1 - \tan^2(\beta)}, -\frac{\pi}{2} \le \gamma \le \frac{\pi}{2}, \quad (10)$$

and $$\sin(2\chi) = \sin(2\beta)\sin(\alpha), -\frac{\pi}{4} \le \chi \le \frac{\pi}{4}. \quad (11)$$

As evident from Eq. (11), the sign of the ellipticity angle is solely determined by the sign of $\sin(\alpha)$ (e.g., since $\sin(2\beta) \geqq 0$ at all times). For $\sin(\alpha) > 0$ or $(0 < \alpha < \pi)$, the ellipticity is positive and the ellipse has a left-handedness by the natural nomenclature. For $\sin(\alpha) < 0$ the ellipticity is negative and the ellipse has a right-handedness. For $\sin(\alpha) = 0$ or $(\alpha = \pm\pi)$ the ellipticity is zero and the light will be linearly polarized.

In the above expressions, (wt−kz) is termed dynamical phase. When a light ray is made to traverse a system comprising a series of birefringent components, the geometric phase affects the relative phase without changing the polarization. That is to say it imparts the same phase shift on the x-component and y-component electric-field vector. Hence, following Eq. (9), the output electric field is fully described by, $$E = \exp(j\Phi)\begin{bmatrix} A_x \\ A_y e^{j\alpha} \end{bmatrix}, \quad (12)$$

where $\Phi$ is the geometric phase shift. For a series of polarization transformation using discrete polarization sensitive elements (e.g., polarizers and retarders), resulting in a closed loop path, the geometric phase is commonly termed Pancharatnam phase shift. This phase shift is equal to half the enclosed solid angle, $\Phi = -\Psi/2$. Note that for a sphere of one unit radius, the solid angle is equal to the area on the curved surface, $\Phi = \Omega$, where $\Phi$ is the solid angle and $\Omega$ is the surface area.

In laser-based illumination systems, the output of an LD is a linearly polarized. This linear polarization can be arbitrary aligned as required with respect to the XY geometry of the optical system. Hence, the $\alpha$ phase difference is either 0 or $\pi$. Hence, the input linear polarization is described as, $$E_{in} = \begin{bmatrix} A_x \\ A_y \end{bmatrix}, \quad (13)$$

Where $A_x$ and $A_y$ are real numbers. After the linear polarization is transformed around a closed loop, the output optical field acquires an additional geometric phase, $\Phi$, $$E_{out} = \exp(j\Phi)\begin{bmatrix} A_x \\ A_y \end{bmatrix}. \quad (14)$$

Following from Pancharatnam's analysis, a closed loop polarization transformation yields geometric phase without changing the output polarization. In order to generate Pancharatnam phase shift, at least two retarder components are required. Further, if only linear or circular retarder components are employed (i.e., no elliptical retarder), at least three components are required for effecting the polarization transformation. For a linear retarder cascade, each retarder element has a uniform axis orientation versus its part thickness. The linear retarder axis (fast or slow) from two successive components should not be aligned parallel to each other.

Figure 6:
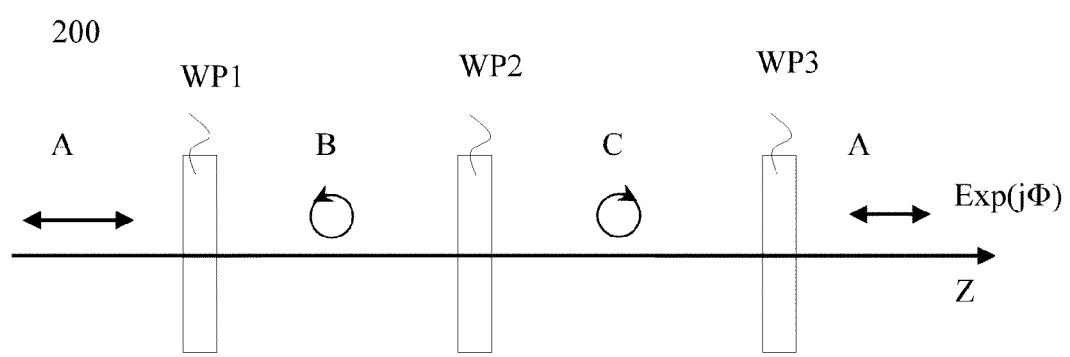
FIG. 6 is a schematic diagram illustrating a 3-stage Pancharatnam phase modulation.

FIG. 6 illustrates a phase modulator device used to induce Pancharatnam phase shift. The phase modulator device 200 converts the first linear polarization output from a laser diode into a first circular polarization using a first waveplate assembly (WP1), transforms the first circular polarization into the second, orthogonal circular polarization utilizing a second waveplate assembly (WP2), and converts the second circular polarization to a second linear polarization using a third waveplate (WP3) assembly. This three-stage waveplate configuration has been proposed to generate variable phase shift.

In accordance with one embodiment of the instant invention, the despeckle device 140 uses a waveplate assembly similar to the phase modulator device illustrated in FIG. 6. In particular, in one embodiment, the despeckle device 140 includes a first single-layer QWP or a multi-layer AQWP with an effective optic axis aligned at $\pm\pi/4$ with respect to the first linear polarization axis, a HWP having an optic axis distribution that is varied as a function of its XY location on the HWP and/or that is varied over one detector integration interval at a given XY site of the illuminated cross-section, and a second single-layer QWP or a multi-layer AQWP with an effective optic axis aligned at $\pm\pi/4$ with respect to the second linear polarization axis. Note that if the first and the second QWP assemblies are aligned with their optic axes parallel, the first and the second linear polarizations are also parallel. Conversely, if they are aligned perpendicular, the first and the second linear polarizations are orthogonal. In either case, the second QWP assembly is aligned with its optic axis at $\pm\pi/4$ with respect to the desired second linear polarization output. The second linear polarization output may be horizontal, vertical or any other linear state therebetween. The second linear polarization can be independently obtained without regard to the first linear polarization. However, as stated earlier, unless the first and the second linear polarization states are parallel, an opened loop polarization transformation is obtained. The actual phase shift is impacted by both the geometric phase shift and the dynamical phase shift. The 3-stage polarization transformation waveplate assembly described above, which induces a variable geometric phase shift, is termed a $Q/H(\theta)/Q$ (i.e., QWP/HWP/QWP) device, where $\theta$ is the azimuthal angle of the middle stage waveplate assembly versus a reference angle.

Figure 7:
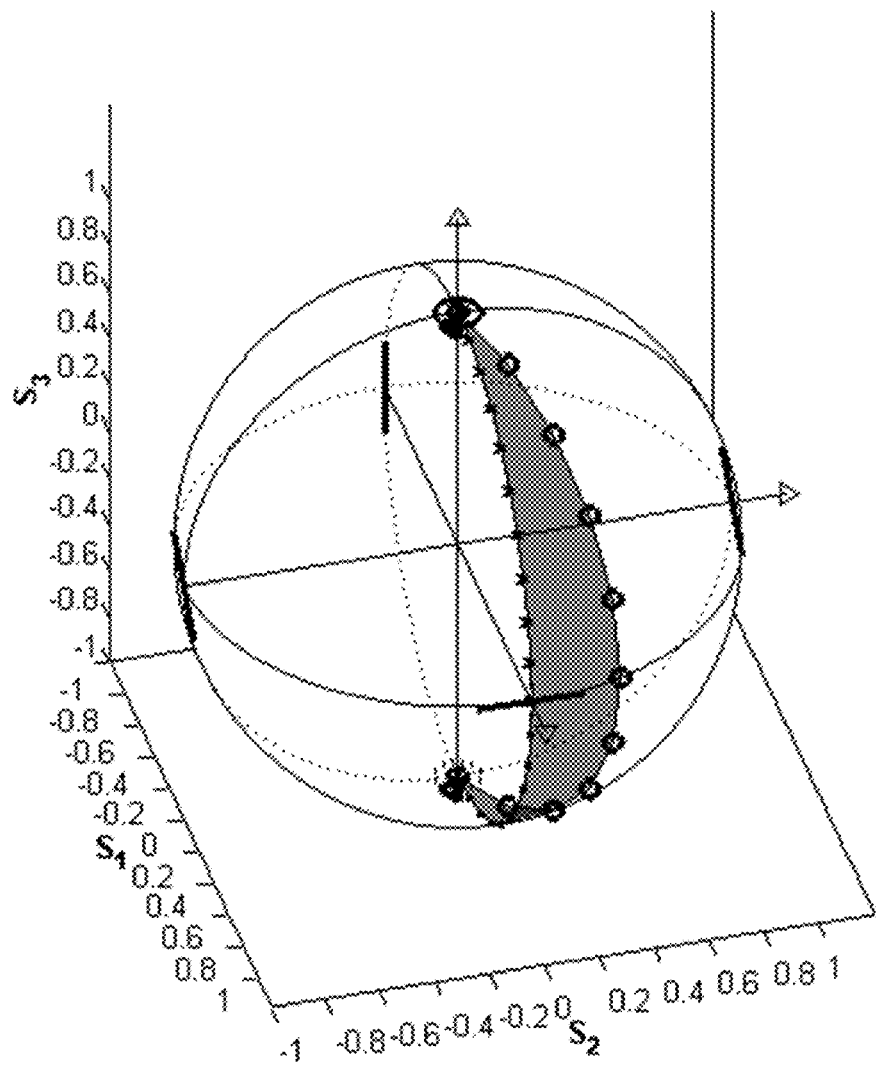
FIG. 7 illustrates the Pancharatnam phase shift obtained by Q/H/Q waveplate polarization transformation.

An example of this $Q/H(\theta)/Q$ transformation is depicted by the PS in FIG. 7. Referring also to FIG. 6, point A is mapped to the RHC at point B ('.' plot) by a QWP having a SA at $\pi/4$. A HWP having a SA orientation at $\theta - \pi/4$ maps point B to point C ('o' plot), traversing through the equator at $2\theta$ orientation. Finally, point C is mapped to point A again ('x' plot) using another QWP having a SA at $\pi/4$. The slice of PS globe enclosed is $2\theta$ radians in angular expanse. Hence, the solid angle enclosed is $4\theta$ (i.e., $2\theta/2\pi \times 4\pi$. The geometric phase is half as much, given as $\Phi = -2\theta$. The HWP SA is only uniquely defined within $\pm\pi/2$ range. Hence, the largest geometric phase shift is $\pm\pi$, giving a $2\pi$ range in total.

It has been stated that geometric phase shift is unbounded. This means that there is no limit to the amount of phase shift that can be derived from the closed loop on the PS by way of polarization transformation. This implies that if a higher order HWP with varied SA orientations is utilized in $Q/H(\theta)/Q$ manner, the total phase modulation can be greater than $2\pi$. However, what matters is the phase dependence with the HWP optic axis variation.

Figure 8:
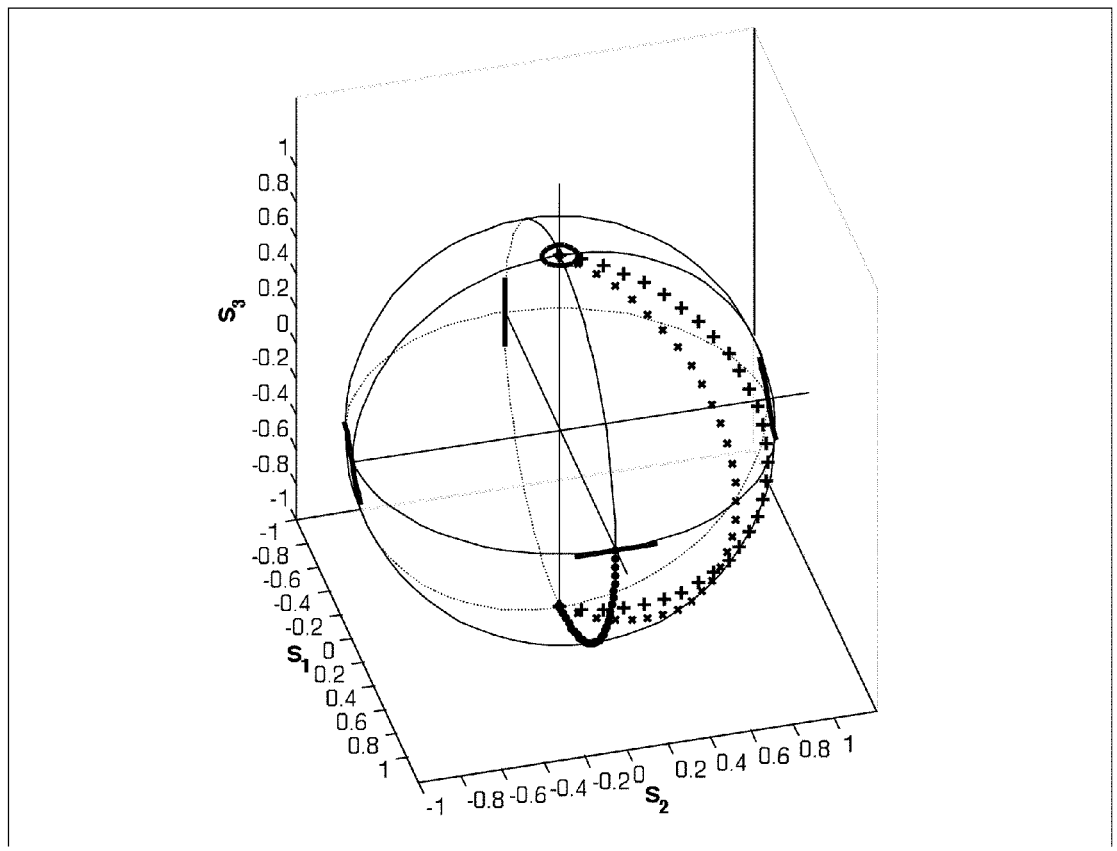
FIG. 8 illustrates multiple geometric phase shifts using a Q/H(θ)/Q 3-stage polarization transformation system.

As discussed above, the slow axis (SA) of the HWP is varied across different XY sites of the illumination cross-section and/or over different time intervals. As a result, a series of geodesic closed loops are generated on the PS as shown in FIG. 8, corresponding to different amounts of phase modulation. The starting point is a linear horizontal polarization, which sits on the PS at the equator. The two intermediate points sit at the opposing poles and depending on the SA of the HWP, a locus of the HWP polarization transformation follows one of the longitudinal lines along the surface of the PS, from pole to pole. Each path taken by the HWP (shown by 'o', 'x' and '+' plots) encloses a closed loop. The result is an enclosed area due to each round-trip polarization transformation. All transformations by the 3-stage optical retarders follows the geodesic routes. The geometric phase shift is again given by half of each enclosed solid angle.

Figure 9A:
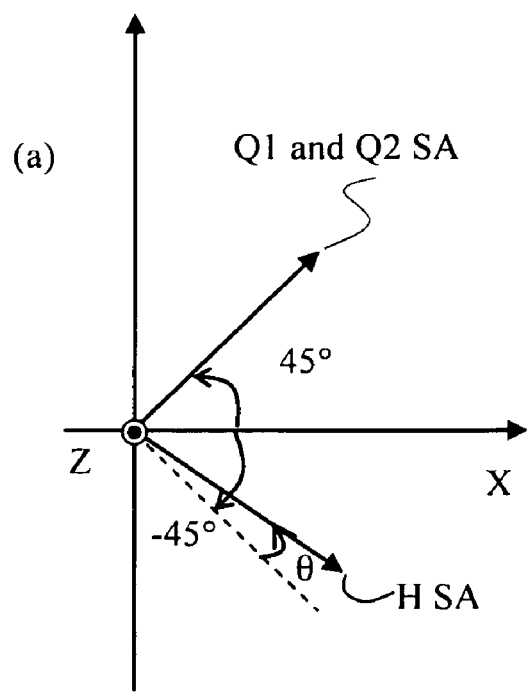
FIG. 9A and FIG. 9B show a schematic layout of 3-stage Q/H(θ)/Q polarization transformation in order to induce Pancharatnam phase shift.
Figure 9B:
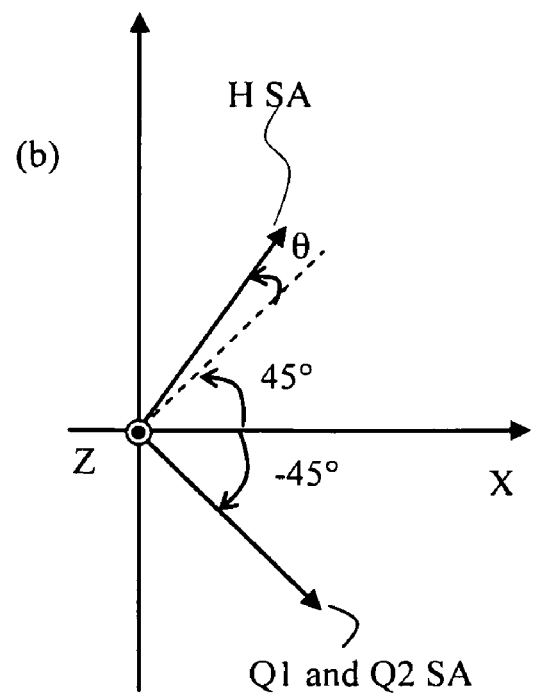

In the case of requiring the first and second linear polarizations to be parallel, the optic axes of the two QWPs are also parallel. In this case, there is still an option to transform the input linear polarization either to RHC or LCH first, each requiring the QWP axis to be aligned with a π/4 offset (sign differs). The two cases of QWP alignment are given in FIG. 9(*a*) and FIG. 9(*b*).

For the calculations to follow, we used a set of Blue (B), Green (G) and Red (R) wavelengths, corresponding to the center of the B, G and R laser peak emissions. For example, utilizing the GaN material system, the B and G center wavelengths are approximately 460 and 520 nm, respectively. The conventional R laser diode utilizing GaAs/InGaAs material system is assumed to have a center wavelength of 635 nm. Further, a natural material dispersion of the single layer QWP is assumed to have a ratio of birefringence, Δn(B)/Δn(G) and Δn(R)/Δn(G) of approximately 1.057 and 0.937, respectively. These birefringence ratios are readily obtained using LC based waveplates. By including the effects of wavelength differences, a QWP which has a π/2 retardation at the G wavelength yields approximately 1.195× and 0.819× of retardation at the B and R wavelengths, respectively. With these inputs of retardation values at B, G and R wavelengths and fixing the HWP at −115 deg. (θ=−70 degrees) and the QWPs having a slow-axis aligned at π/4, the Stokes vector evolutions through a system of Q/H(θ)/Q waveplates are depicted in FIGS. 10(*a*), (*b*), and (*c*) for B, G and R wavelengths, respectively.

Figure 10A:
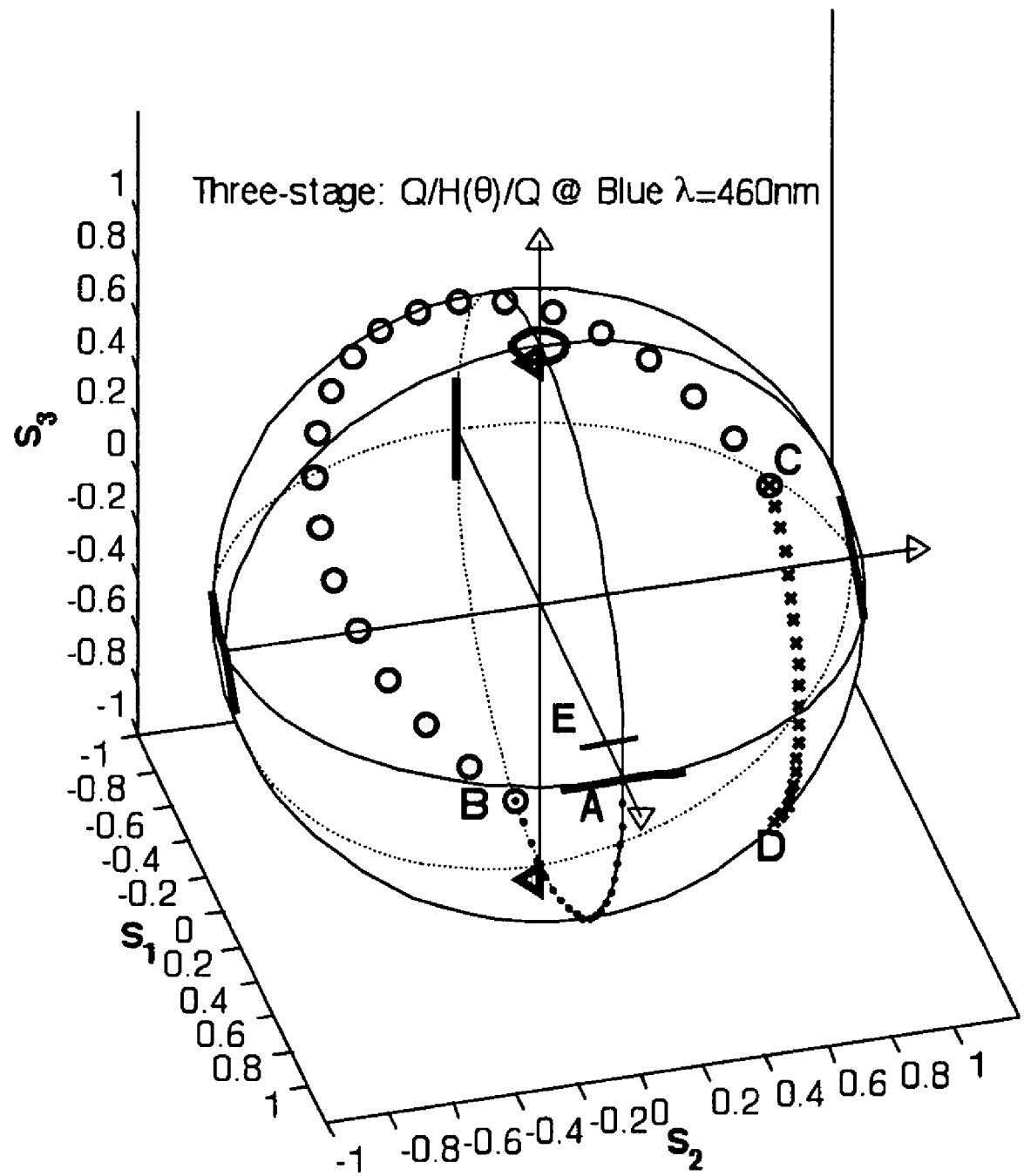
FIG. 10(a) illustrates the polarization transformation by Q/H(θ)/Q waveplates at 460 nm wavelength.
Figure 10B:
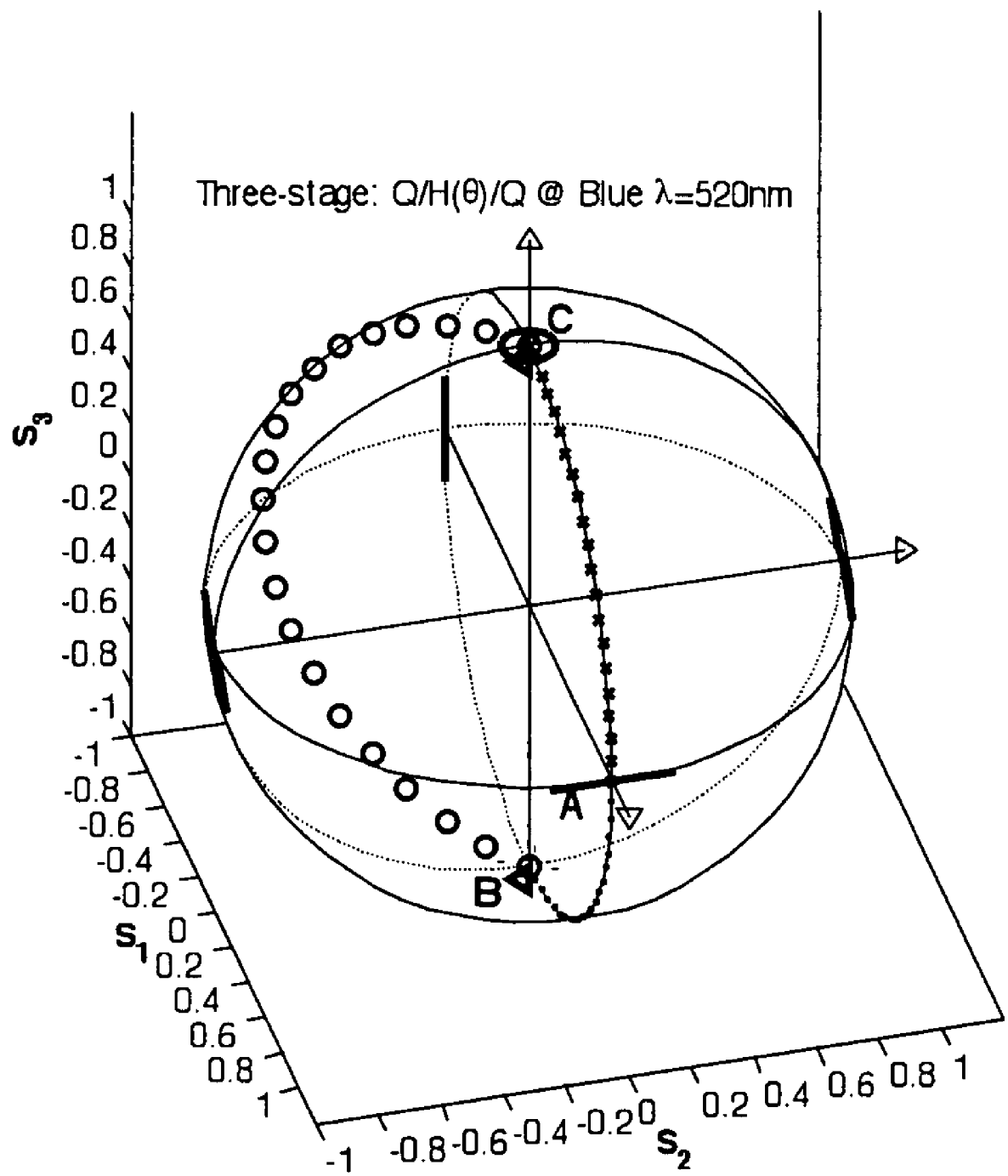
FIG. 10(b) illustrates the polarization transformation by Q/H(θ)/Q waveplates at 520 nm wavelength.
Figure 10C:
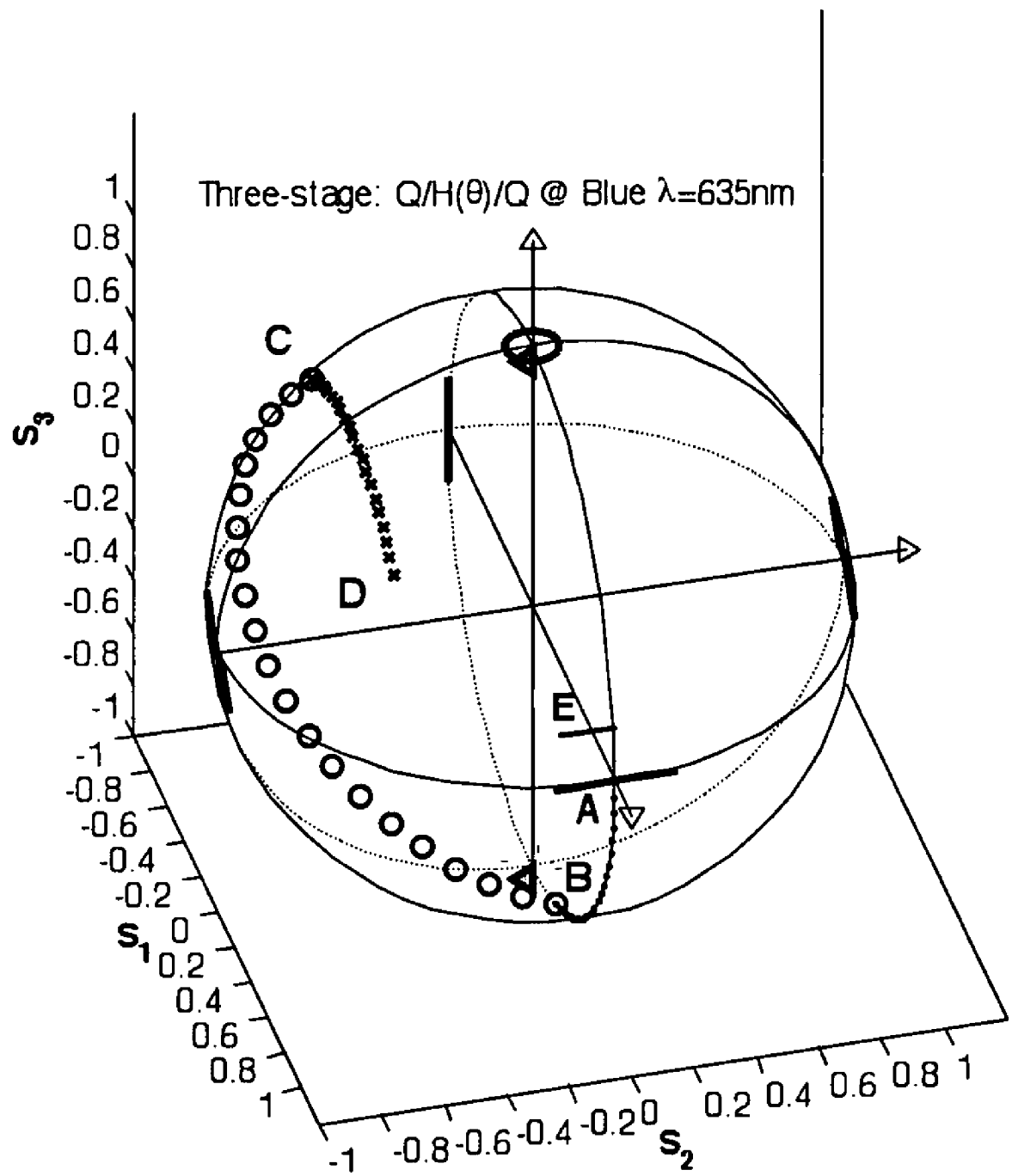
FIG. 10(c) illustrates the polarization transformation by Q/H(θ)/Q waveplates at 635 nm wavelength.

From the PS diagram shown in FIG. 10(*b*), it's evident that the two QWPs transforms linear to circular polarizations and vice versa as required at the G design wavelength. The HWP transforms one circular polarization to the orthogonal circular polarization, also given by the π retardance at the design wavelength. Therefore, the geometric phase shift of the closed loop geodesic path ABCA at the G wavelength is given by −2θ or 140 degrees.

In contrast, the polarization locus of the B wavelength illustrated in FIG. 10(*a*) overshoots the south pole location on the PS, while that of the R wavelength (e.g., FIG. 10(*c*)) does not reach the south pole location. As a result of a higher retardation than the required π/2 in the QWP and π in the HWP, at the B wavelength, the polarization of light transmitted through the third waveplate transform ends at point D, instead of closing the loop at point A. From the theory of geometric phase shift, the phase factor can still be extracted by closing the loop with a fictitious geodesic path to the intended point A. Since the polarization is not preserved, dynamical phase as well as geometric phase both contribute to instantaneous phase of the blue wave output. However, in a polarization based display, the illumination has to be cleaned up for high polarization purity. Accordingly, a polarizer is typically inserted with its transmission axis parallel to the original laser output polarization (e.g., horizontal polarization in FIG. 6). With an elliptical polarization state at point D, a loss is incurred by taking only the horizontal polarization component. Point D is then transformed to point E, with a reduced length electric field vector. The horizontal polarizer is assumed to be ideal and to completely block the orthogonal linear polarization (e.g., vertical polarization). Also, it is assumed that the polarizer does not introduce common transmission loss or relative phase difference (i.e., is not birefringent). A similar treatment is applied to the polarization output at 635 nm wavelength.

In order to extract the geometric phase dependence at each wavelength of calculation, the following computation is performed. First, the Jones vector at the given wavelength and HWP angle θ is computed using, $$V(\lambda, \theta) = J\left(\Gamma_Q(\lambda), \frac{\pi}{4}\right) \times J\left(\Gamma_H(\lambda), \theta - \frac{\pi}{4}\right) \times J\left(\Gamma_Q(\lambda), \frac{\pi}{4}\right)\begin{bmatrix}1\\0\end{bmatrix}. \quad (15)$$

The input polarization is assumed linear horizontal. The retardances of the QWP and HWP, $\Gamma_Q$ and $\Gamma_H$ are evaluated at required wavelength and slow-axis orientations. In general, both X- and Y-components of the electric field vector, V, acquire some phase factors, as given by, $$V(\lambda, \theta) = \begin{bmatrix} A_x e^{j\phi_x} \\ A_y e^{j\phi_x} \end{bmatrix} \quad (16)$$
$$= \exp(j\phi_x)\begin{bmatrix} A_x \\ A_y \exp(j[\phi_y - \phi_x]) \end{bmatrix}.$$

With an ideal polarizer assumption, a dot product is taken of the Jones vector output, yielding, $$V'(\lambda, \theta) = \begin{bmatrix} A_x e^{j\phi_x} \\ A_y e^{j\phi_x} \end{bmatrix} \cdot \begin{bmatrix} 1 \\ 0 \end{bmatrix} \quad (17)$$
$$= \exp(j\Phi)\begin{bmatrix} A_x \\ 0 \end{bmatrix}.$$

Therefore, the geometric phase shift from arbitrary locus of polarization transformation on the PS can be obtained by Jones calculus without having to evaluate the enclosed surface area on the PS. The resultant electric vector now has $A_x$ length, rather than unity.

Figure 11:
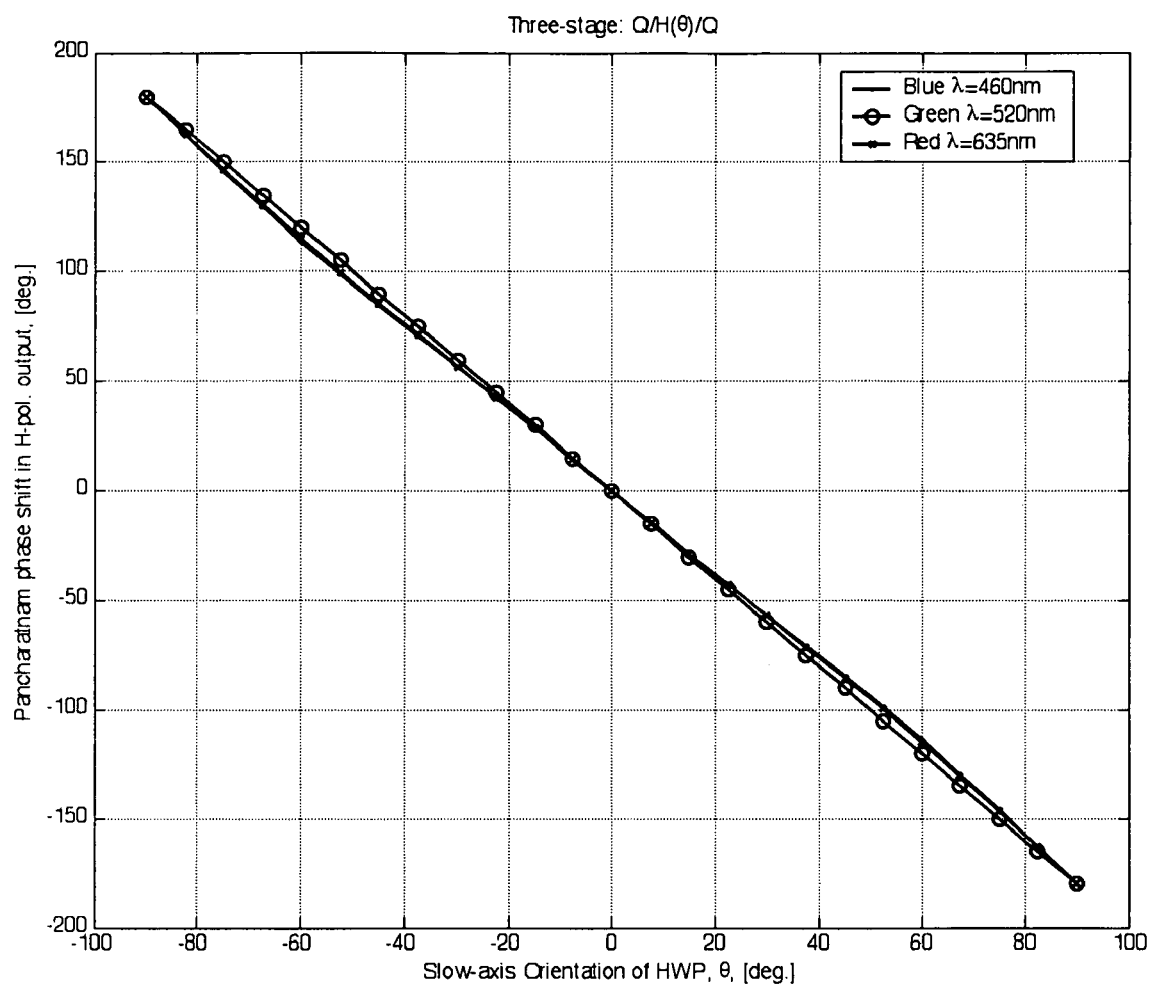
FIG. 11 is a graph showing calculated geometric phase shift derived from multiple XY sites of a 3-stage Q/H(θ)/Q device having the entire range of HWP slow-axis orientations between ±π.
Figure 12:
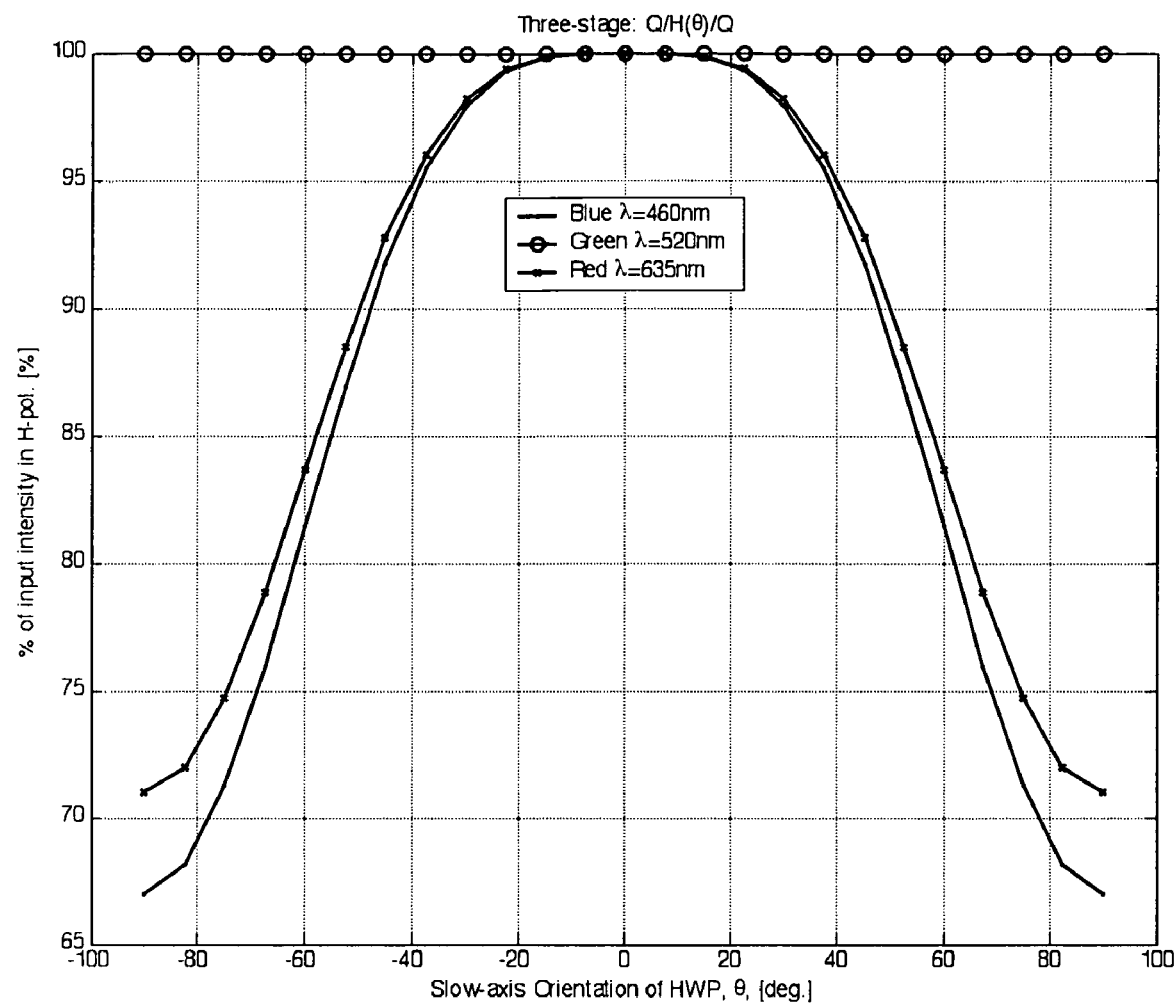
FIG. 12 is a graph showing calculated intensity fraction along the input linear polarization (H-polarization) at multiple XY sites of a 3-stage Q/H(θ)/Q device having the entire range of HWP slow-axis orientations between ±π.

In embodiments where the HWP has a fixed spatially varied slow axis the geometric phase shift is calculated for a plurality of continuously varied orientations. Taking all the possible HWP slow-axis orientations when the HWP is spun in a rotary motion about a certain normal axis, the geometric phase shift, and therefore, the phase modulation of the laser beam at each local XY site is calculated by extracting the phase factor of the output Jones vector. These phase dependence results are shown in FIG. 11. The G channel geometric phase is exactly −2θ because both the QWP and HWP are ideally π/2 and π retardance at the calculation wavelength. The B and R wavelength are also approximately linear in the phase modulation versus the HWP slow-axis. Although the phase modulation via the geometric phase shift effect in a Q/H(θ)/Q device is approximately independent of the wavelength of operation, the transmitted power calculation through the idea polarizer reveals power losses at the B and R wavelengths. The calculated intensity of light remaining in the horizontal linear polarization state is shown in FIG. 12.

The HWP SA is varied through ±π in the calculations. As is shown in the plots, the power is close to unity for the first ±20 degrees of HWP SA orientations. The G channel power is maintained because the polarization is always brought back to the linear horizontal before applying the polarizer. The B and R channels may incur up to 33% and 29% power loss at the extreme θ=π/2 orientations.

Figure 13:
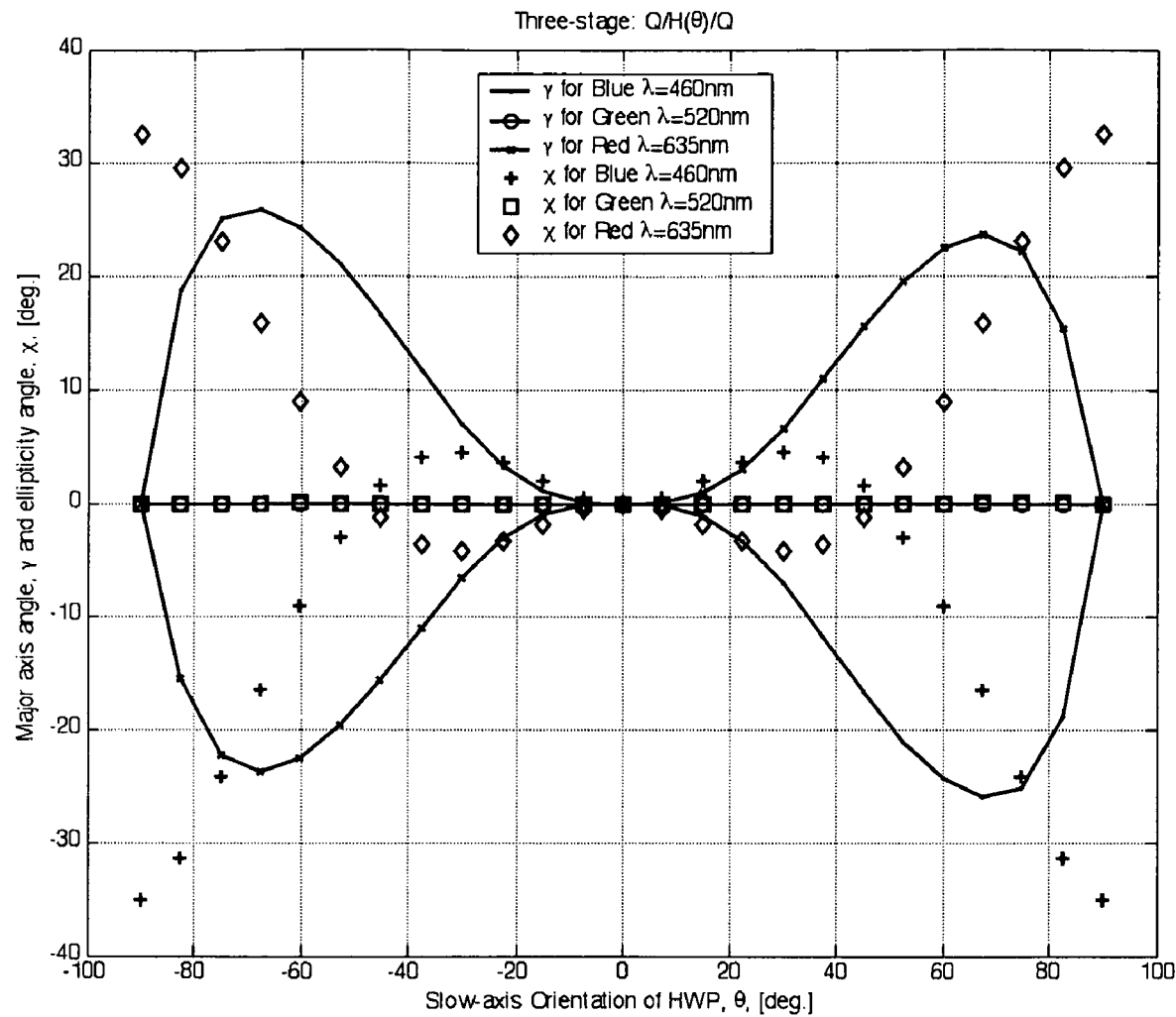
FIG. 13 is a graph showing calculated major-axis angle of elliptical polarization and ellipticity angle at multiple XY sites of a 3-stage Q/H(θ)/Q device having the entire range of HWP slow-axis orientations between ±π.

In embodiments where the HWP is electronically actuated (i.e., the slow axis is switchable), the SA variation will be typically limited to ±π/4, and all three channels are expected to maintain about 90% power fraction (disregarding AR losses, absorption, etc. in the Q/H(θ)/Q device). A closer look at the major axis of the elliptical polarization output before the ideal polarizer reveals that the output polarization is only slightly offset in long axis from the input polarization. The calculated γ angle is within ±26 degrees for the entire range of θ between ±π/2. Accordingly, there is no risk of the output polarization being orthogonal to input polarization and being blocked by the analyzer as a result. However, the ellipticity angle approaches ±35 degrees in the extreme HWP SA orientations. These results are shown in FIG. 13.

Figure 14:
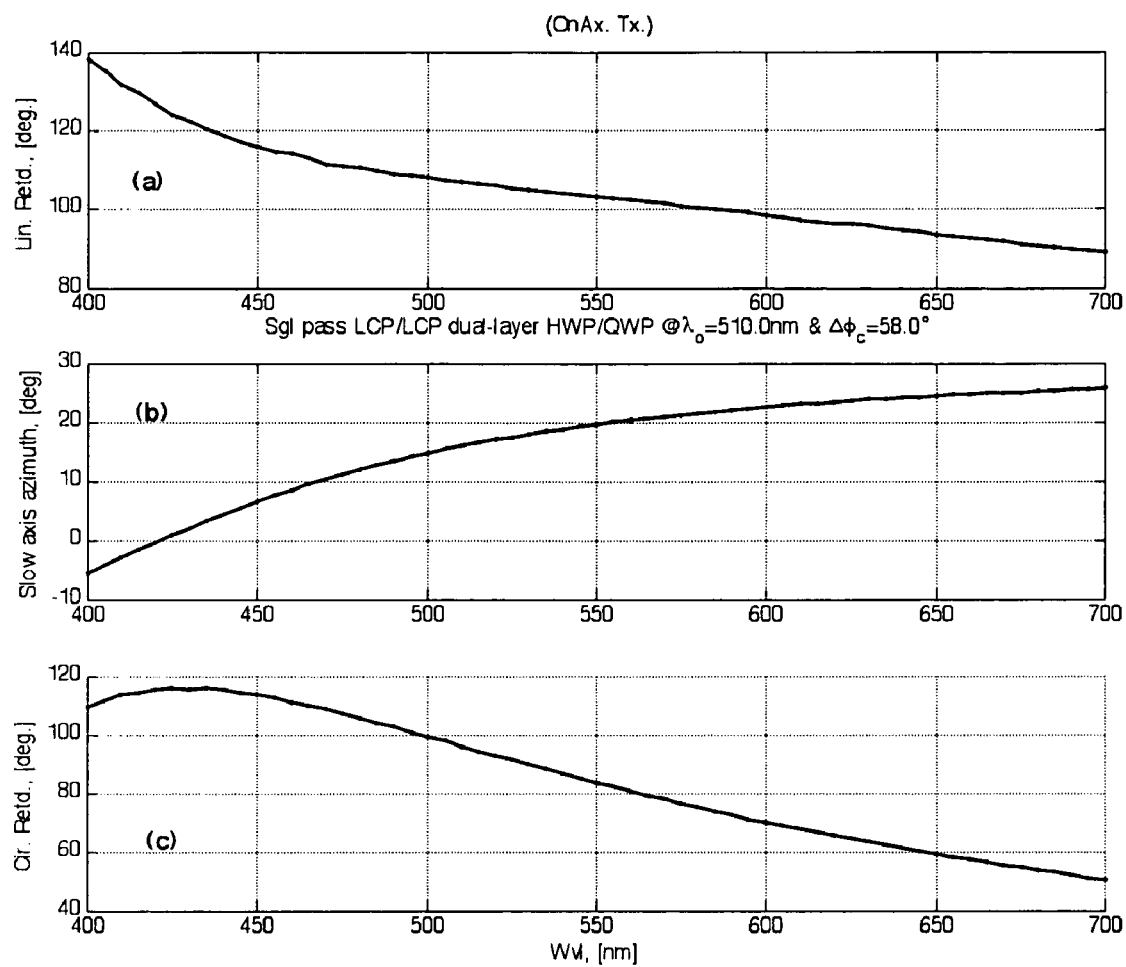
FIG. 14 is a graph showing calculated single-pass retardance characteristics of a dual-layer AQWP design at normal incidence.
Figure 15:
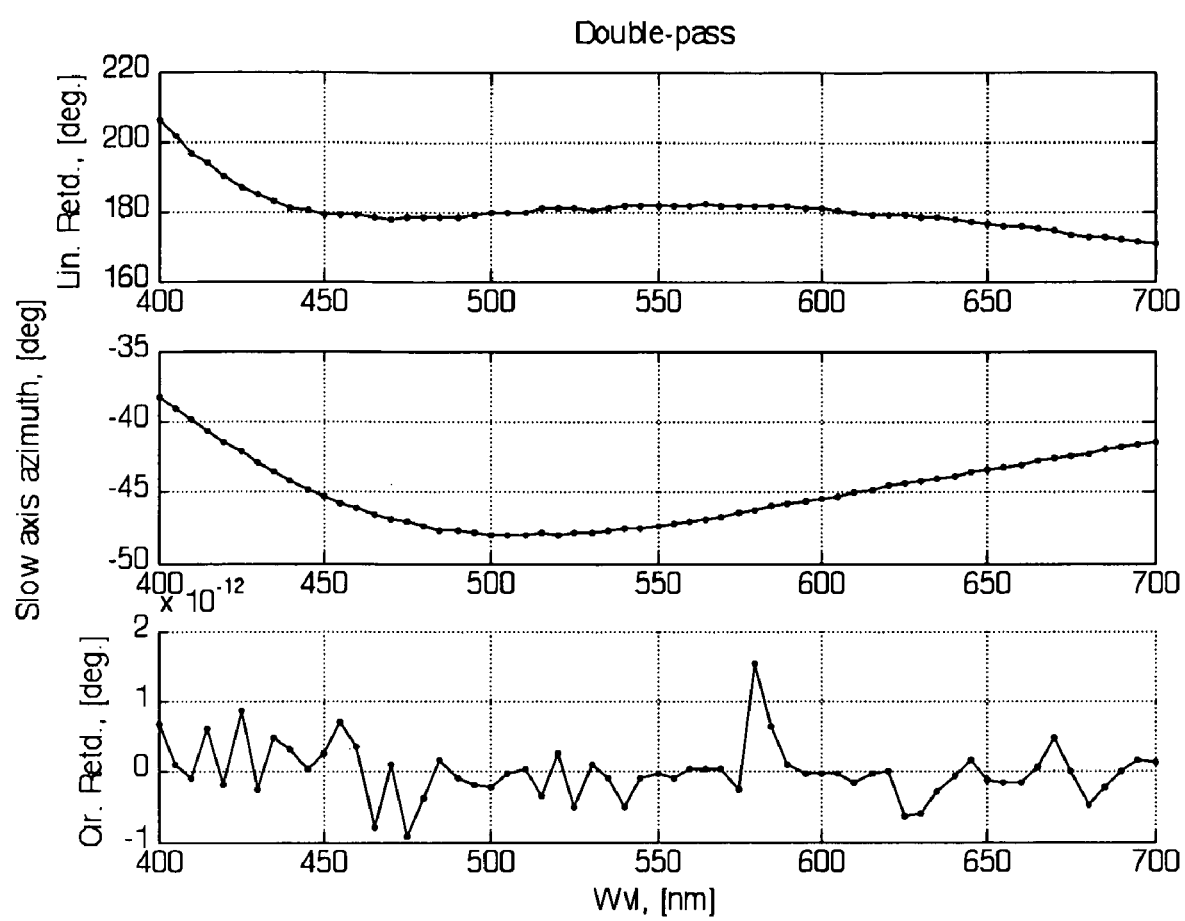
FIG. 15 is a graph showing calculated double-pass retardance characteristics of a dual-layer AQWP design at normal incidence.

One way of increasing the spectral bandwidth of a QWP design is to employ two or more birefringent layers. For example, in one embodiment a two-layer achromatic AQWP design includes, in order from the input light side, a first HWP layer aligned at a given axis, and a second QWP layer aligned at a second angle. The resultant waveplate is an inhomogeneous cascade of two retarders. Circular retardance as well as linear retardance can be optimized across the required wavelength band in order to convert linear polarization to circular polarization and vice versa. The resultant linear retarder slow-axis approximately bisects the slow-axes of the constituent HWP and QWP elements. For polarization conversion, the constituent HWP and QWP slow-axes are symmetrically offset from approximately ±π/4. For example, in one embodiment an AQWP is formed from a HWP and a QWP at λ=510 nm, cascaded with their optic axes offset at 58 degrees azimuthal angle. The calculated linear retardation magnitude (a), linear retardation orientation (b), and circular retardation (c), for a single pass are shown in FIG. 14. At the design wavelength of 510 nm, the linear retardance is approximately 107 degrees and the slow-axis is approximately 16 degrees. The circular retardance is approximately 97 degrees at the design wavelength. These retardance characteristics are combined to provide a broadband AQWP that converts a linear polarization (i.e., horizontal-polarization or vertical polarization) to a circular polarization output. The calculated linear retardation magnitude (a), linear retardation orientation (b), and circular retardation (c), for a double-pass of the inhomogeneous retarder are shown in FIG. 15. It is evident from these results that the net retardance in double-pass is approximately 180 degrees and that the slow-axis is approximately −45 degrees. The circular retardance is nearly zero. This combination converts a horizontal-polarization light to vertical polarization and vice versa. The effective slow-axis shown is referenced to the reflection RH-XYZ coordinate where the X-axis is inverted. Consequently, the single-pass AQWP must also convert a linear polarization to a circular polarization efficiently over the entire visible band.

Figure 16A:
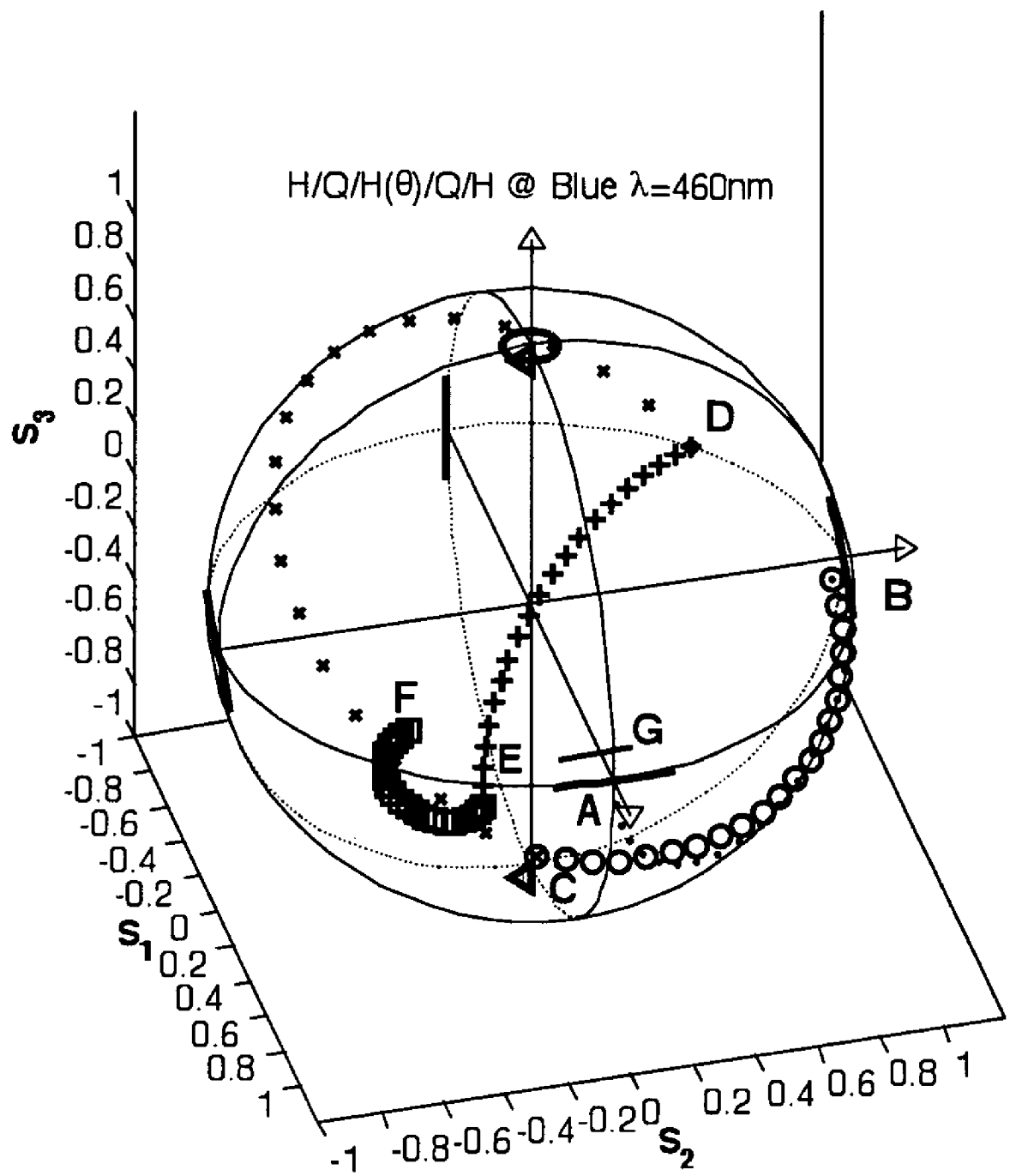
FIG. 16(a) illustrates polarization transformation by H/Q/H(θ)/Q/H waveplates at 460 nm wavelength.
Figure 16B:
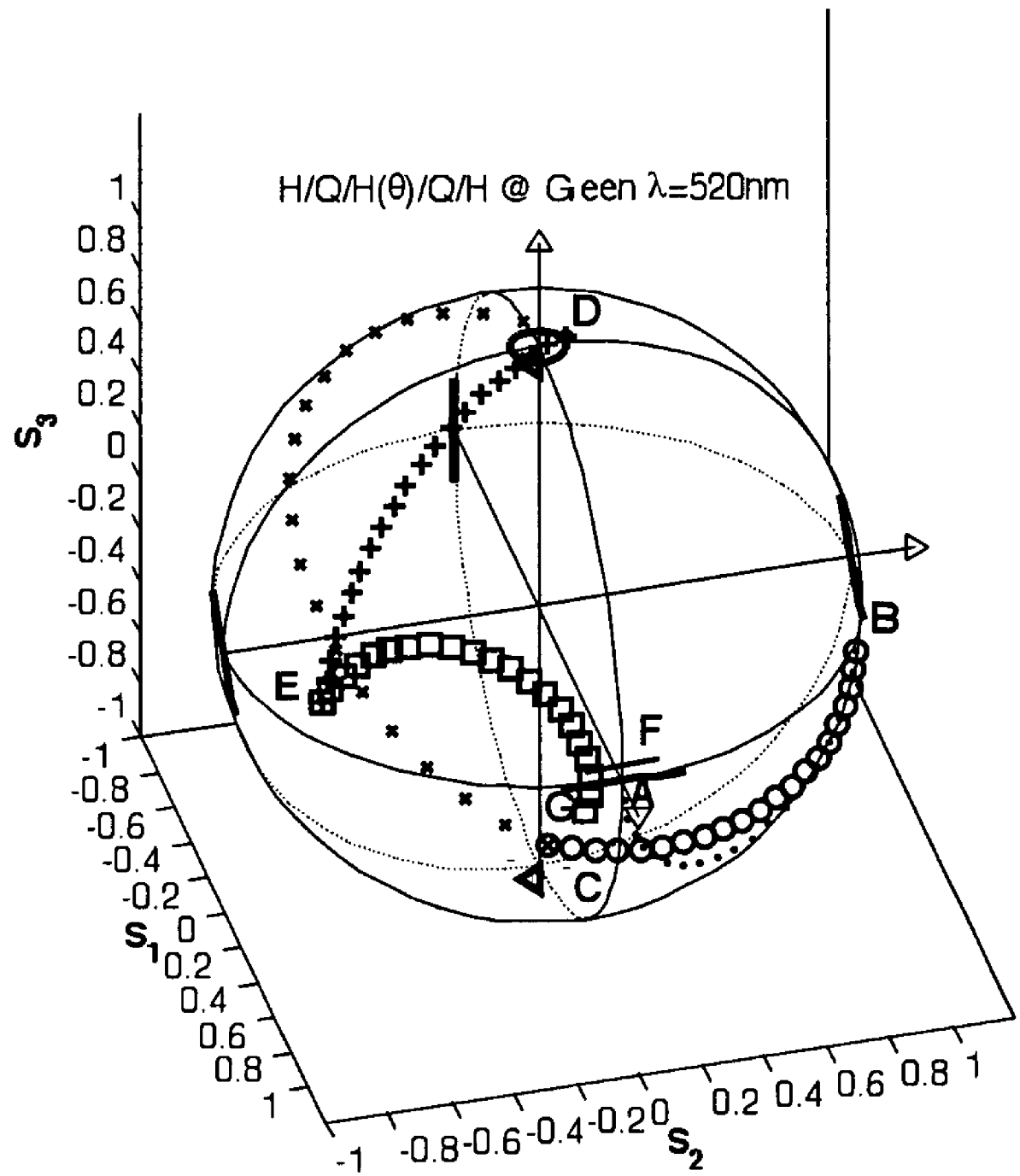
FIG. 16(b) illustrates polarization transformation by H/Q/H(θ)/Q/H waveplates at 520 nm wavelength.
Figure 16C:
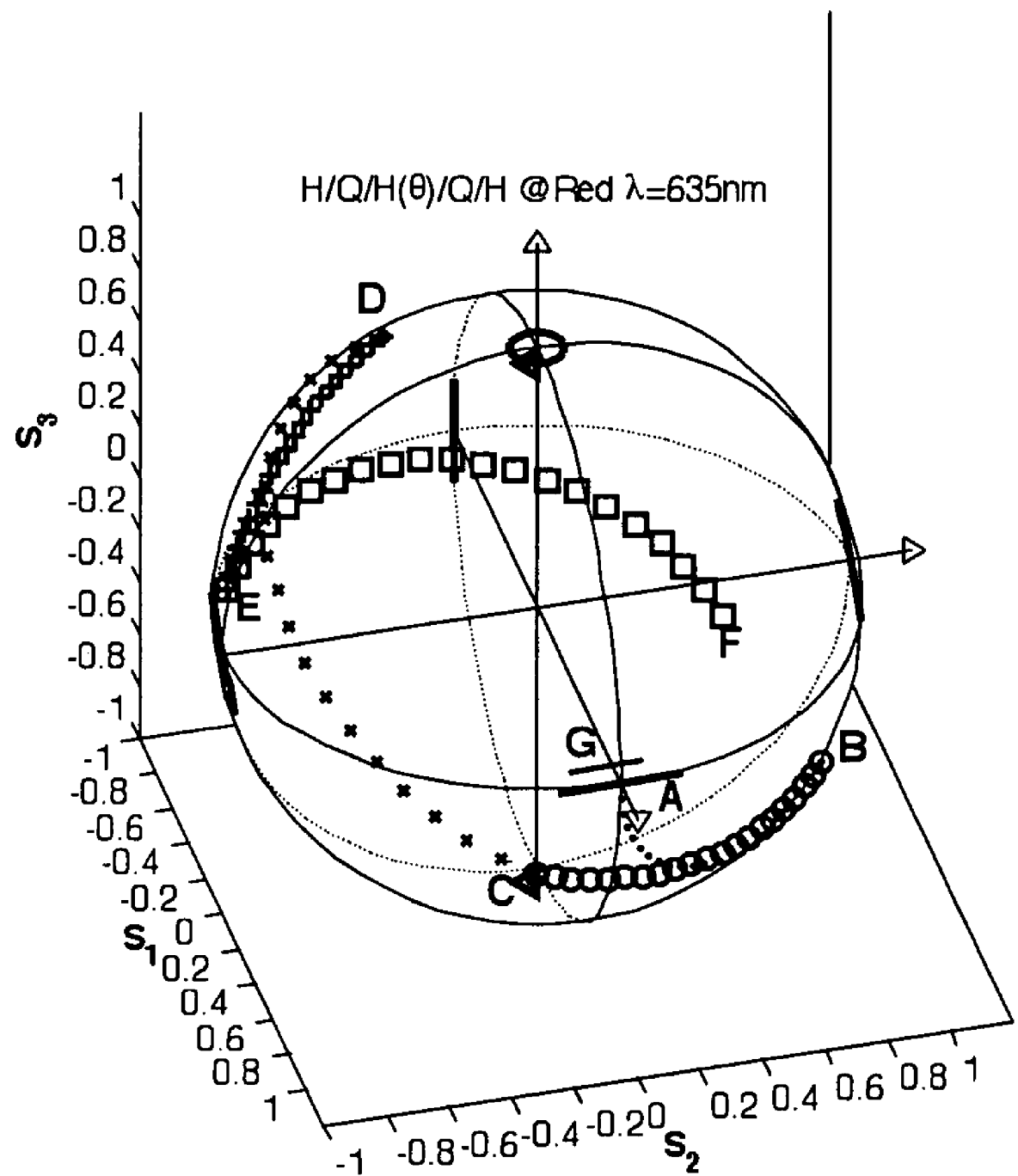
FIG. 16(c) illustrates polarization transformation by H/Q/H(θ)/Q/H waveplates at 635 nm wavelength.

In accordance with one embodiment of the instant invention, the despeckle device 140 uses a waveplate assembly similar to the phase modulator device illustrated in FIG. 6, wherein WP1 and WP3 are AQWPs, and WP2 is a HWP with an optic axis distribution that is varied as a function of its XY location across the HWP and/or that is varied over one detector integration interval at a given XY site of illumination cross-section. Following the above-described design of 2-layer AQWP, the resulting three-stage variable geometric phase modulation device is configured as H/Q/H(θ)/Q/H, where H and Q are uniform-axis HWP and QWP at a design wavelength which gives an achromatic linear to circular polarization conversion at the required B, G and R laser wavelengths. The H and Q slow-axes are fixed. The HWP having a spatially varied slow axis, H(θ) may be tailored for true π retardance at or near the G laser wavelength. Applying the Stokes vector transformation on the PS globe and assigning the SA of the variable axis HWP to −70 degrees (i.e., θ=−70 degrees offset from −π/4) and arranging for the slow-axes of the Q and H waveplates to be symmetrically offset by ±29 degrees from π/4 axis, the polarization transformations are illustrated in FIGS. 16(a), (b), and (c) at B, G and R wavelengths, respectively. Referring first to the G channel transformation, the first fixed H waveplate maps the horizontal linear polarization input at point A to point B near the equator ('.' plot), the first Q waveplate maps point B to point C near the south pole ('o' plot), the variable H(θ) at −115 degrees SA alignment versus X-axis maps point C near the south pole (nearly RHC) to point D near the north pole (nearly LHC) ('x' plot), the second Q waveplate maps point D to point E near the equator ('+' plot), and finally a second H waveplate maps point E to point F which is approximately the original input linear polarization (' ' plot). Therefore, the 3-stage device with five retarder layers forms a polarization loci of ABCDEF. Point F is ideally the same as the input linear horizontal polarization.

In a display system utilizing polarization image modulation, the polarizer takes the component of light polarized parallel to the input beam. Hence, point F is transformed to point G, which has the same polarization as point A, but has a reduced length electric-field vector. By assuming an ideal polarizer following the 3-stage device, a closed loop polarization transformation is obtained. Here, it's not straightforward to compute the enclosed surface area, in order to extract the geometric phase shift at each required wavelength and for each varied HWP axis. As can be seen in FIGS. 16(a) and (c), the input polarization for the B and R channels are transformed to an output with significant ellipticity and misalignment of major axis angle versus the ideal linear horizontal polarization output.

Figure 17:
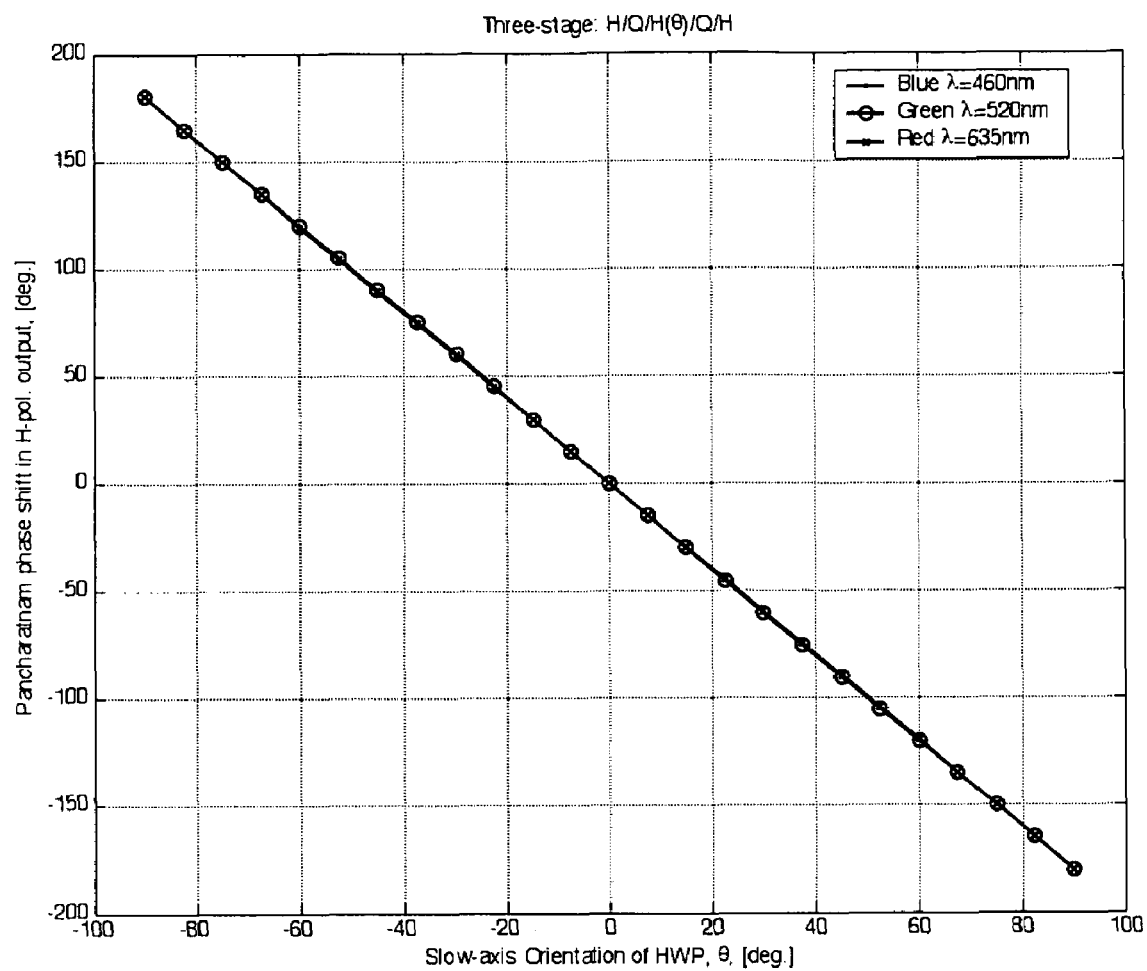
FIG. 17 is a graph showing calculated geometric phase shift derived from multiple XY sites of a 5-stage H/Q/H(θ)/Q/H device having the entire range of HWP slow-axis orientations between ±π.

Again taking all the possible H(θ) slow-axis orientations when the HWP is spun in rotary motion about a certain axis, the geometric phase shift, and therefore, the phase modulation of the laser beam at each local XY site of illumination cross-section is calculated by extracting the phase factor of the output Jones vector. The phase dependence of RGB channels results are shown in FIG. 17.

In one configuration of WP3, the azimuthal offset of the constituent fixed orientation QWP and HWP are made the negative sign of the angle offsets of the corresponding QWP and HWP layers in WP1. Both waveplate assemblies are offset from the same nominal bisector axis of H and V polarization directions. In this case, the geometric phase induced has cancellation of the constant phase shifts of the two stacks of AQWP. The overall phase shift is 0 and θ=0. For the H(θ) axis that varies from 0 to ±π/2, the total geometric phase shift is again ±π.

For an alternate AQWP configuration where WP3 has the same sign of HWP and QWP angle offset as WP1, an overall constant geometric phase shift is obtained for the 3-stage device with five retarder layers (results not shown here). With the HWP axis θ=0 degrees, the induced geometric phase for the G channel is approximately −118 degrees. Over the ±π/2 H(θ) axis variation from the −π/4 axis, the variable geometric phase ranges from 62 degrees to −298 degrees. The variable phase shift is exactly $-2\theta$ and maximum phase modulation is $\pm\pi$ for a maximum of $\pm\pi/2\theta$ range. The additional phase shift at $\theta=0$ degrees is attributed to the unbounded nature of the geometric phase shift and the use of additional waveplates in the 3-stage H/Q/H($\theta$)/Q/H device. The B and R wavelength for the alternate configuration are also approximately linear in the phase modulation versus the HWP slow-axis. Their phase offsets at $\theta=0$ differ from the G channel phase offset, due to the dispersion effects of the waveplates. This again shows that the phase modulation via the geometric phase shift effect in a H/Q/H($\theta$)/Q/H device is approximately independent of the wavelength of operation.

Figure 18:
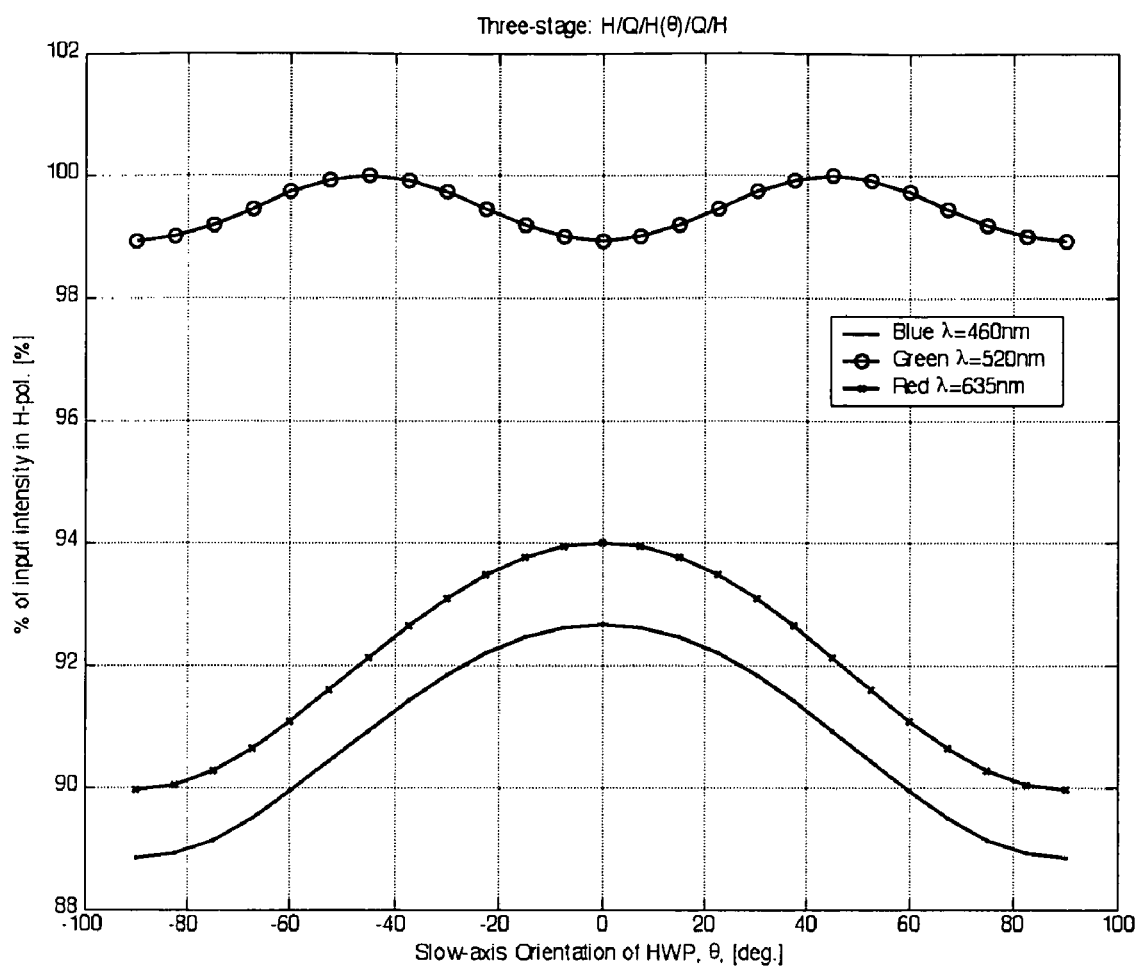
FIG. 18 is a graph showing calculated intensity fraction along the input linear polarization (H-polarization) at multiple XY sites of a 5-stage H/Q/H(θ)/Q/H device having the entire range of HWP slow-axis orientations between ±π.
Figure 19:
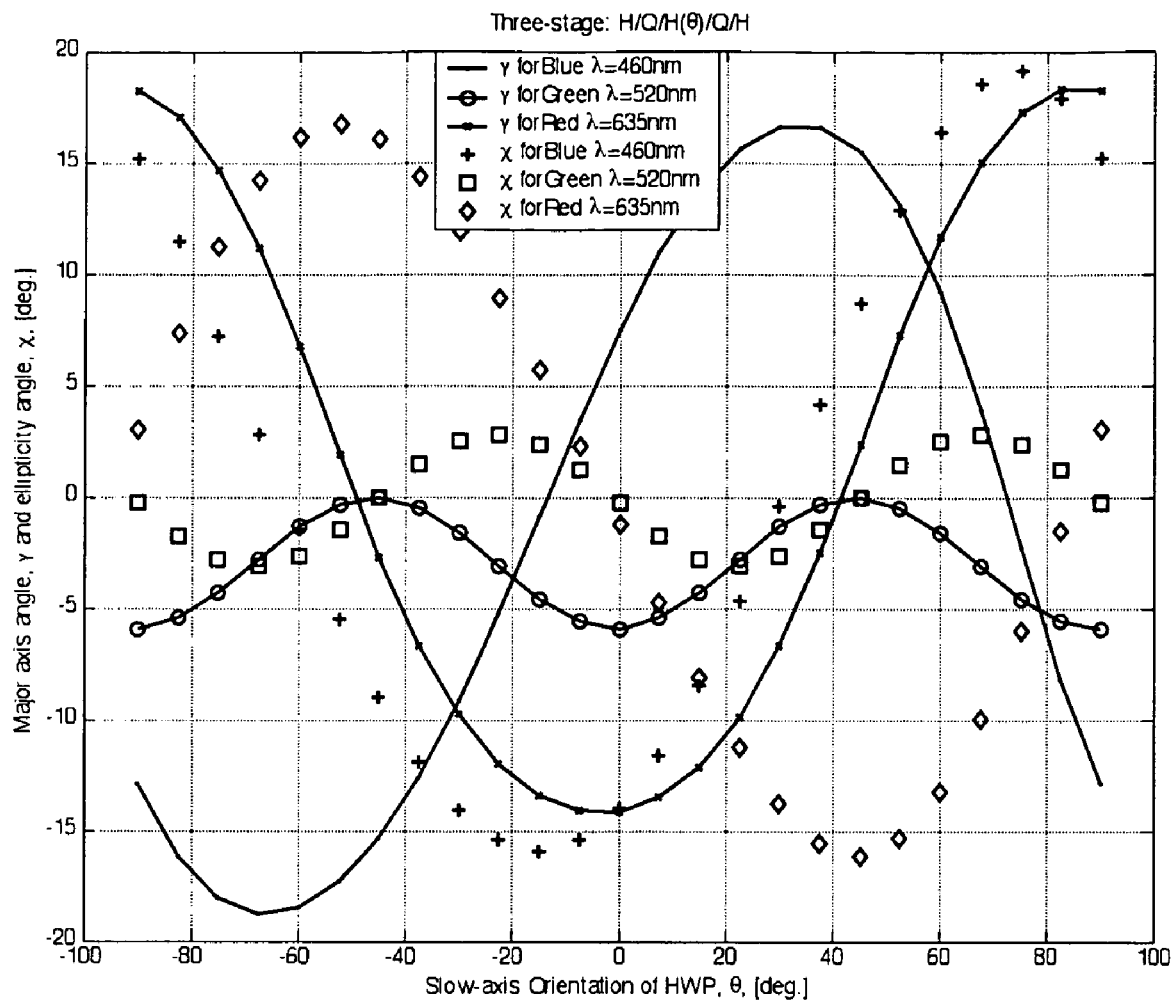
FIG. 19 is a graph Calculated major-axis angle of elliptical polarization and ellipticity angle at multiple XY sites of a 5-stage H/Q/H(θ)/Q/H device having the entire range of HWP slow-axis orientations between ±π.

The calculated intensity of light remaining in the horizontal linear polarization state after passing through the H/Q/H($\theta$)/Q/H device is shown in FIG. 18. The transmitted power through the idea polarizer reveals much less intensity loss at the B and R wavelengths. The HWP SA is varied through $\pm\pi$ in the calculations. As is shown in the plots, the G channel maintains at least 99% intensity for horizontally polarized light, whereas the B and R channel yield between 88% and 94% of input intensity of the horizontally polarized light. The 3-stage device with five retarder layers gives an improved power at large $\theta$ rotations. With the 3-stage device design having five retarder layers, the major axis and ellipticity angles of the elliptical polarization output before the ideal polarizer are made closer to the characteristics of the linear horizontal input polarization. The calculated $\gamma$ angle is within $\pm 20$ degrees for the entire range of $\theta$ between $\pm\pi/2$ and for all three channels. The ellipticity angles are less than $\pm 20$ degrees for all SA orientations. These results are shown in FIG. 19.

Figure 20A:
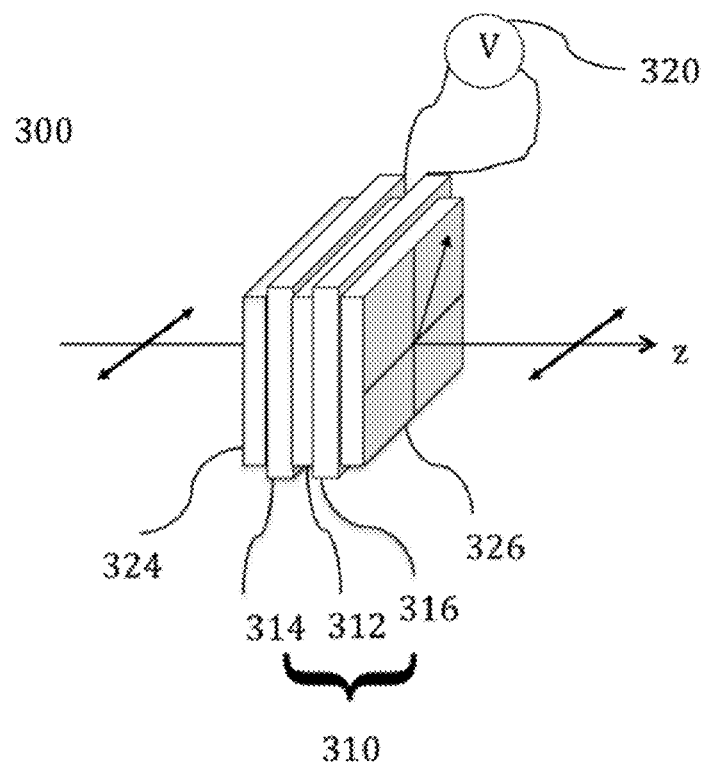
FIG. 20(a) is a schematic diagram of a despeckle device according to one embodiment of the instant invention, including an electrically switchable HWP and two QWPs.
Figure 20B:
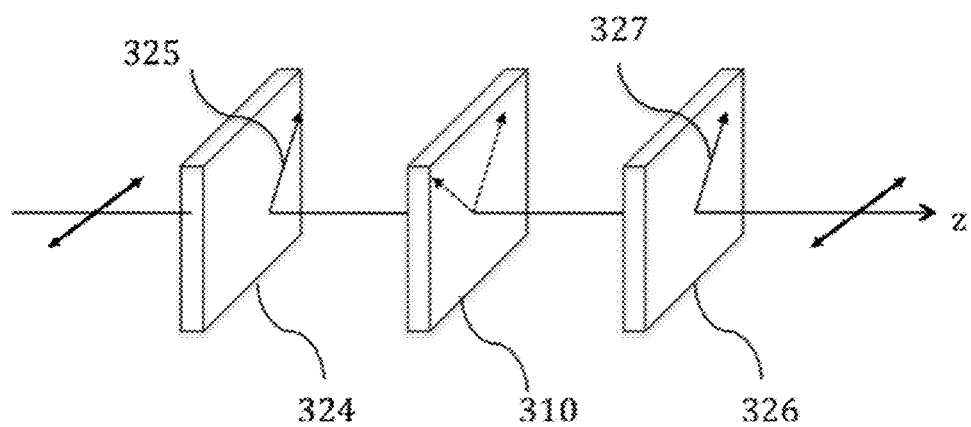
FIG. 20(b) is an exploded view of the despeckle device illustrated in FIG. 20(a) showing the slow axis orientations of the electrically switchable HWP and two QWPs (substrates are omitted for clarity)

Referring to FIGS. 20(*a*) and 20(*b*), there is shown a despeckle device 300 according to one embodiment of the instant invention. In this embodiment, the despeckle device 300 includes a near HWP 310 made of active LC retarder. The LC retarder 310 includes an in-plane switching (IPS) material 312, such as planar aligned nematic LC, sandwiched between two parallel plates 314, 316. On the input side of the device, a first QW layer (or a multi-layer AQWP) 324 is coupled to the first parallel plate 314 with its effective optic axis 325 aligned at $\pi/4$ with respect to the linear polarization axis of the input laser light. On the output side of the device, a second QW layer (or a multi-layer AQWP) 326 is coupled to the second parallel plate 316 such that its effective optic axis 327 is also aligned at $\pi/4$ with respect to the linear polarization axis of the input laser light. In one embodiment, the external QWP retarder layers 324, 326 are coated on the LC cell substrates 314, 316 using deposition techniques. In other embodiments, the external QWP retarder layers 324, 326 are provided via the lamination of organic foil materials. The near half-wave retarder 310 is actuatable to have a spatially and temporally varied optic axis (e.g., the optic axis or slow axis varies as a function of XY location across the retarder and/or illumination cross-section). More specifically, the near half-wave retarder 310 includes a plurality of cell partitions or pixels that are independently controlled to provide the variable slow axis. The plurality of LC pixels is patterned to obtain sub-resolution spot partitions, with respect to the resolution of the detector and/or image forming device (not shown).

An actuator 320 is provided to actively vary the slow axis of each LC pixel in a random or predetermined pattern (e.g., to switch the orientation of the slow axis within the plane of the optical retarder) over one detector integration interval. In one embodiment, the actuator 320 electronically controls the individual LC pixels by applying a voltage to a plurality of ITO electrodes disposed on the substrate 314 and the cover glass 316. More specifically, the actuator 320 includes a pixilated transparent electrode structure that defines the LC pixels. For example, in one embodiment the LC is switched via fringe field switching. In another embodiment, the LC is a ferroelectric LC (FLC). In these embodiments, the slow axes of the active HWP will be continually switched between $-\pi/4$ and $+\pi/4$, or between $+\pi/4$ and $3\pi/4$. The range of $\pi/2$ is quoted due to the current limitations of commercially available in-plane switching LC materials. For example, FLC such as CHISSO 2004 can be rotated in the plane of the LC device by $\pi/2$. Nematic IPS LC switched via lateral electrodes is similarly limited to $\pi/2$ rotation angle.

In operation, a laser input beam (e.g., horizontal polarization) passes through the first QW layer 324 where it becomes circularly polarized (e.g., having a first handedness), passes through the HWP 310 where the handedness changes to the opposite sense (e.g., has a second opposite handedness), and passes through the second QW layer 326 where it become linearly polarized again (e.g., horizontal polarization since the QWP slow axes are parallel). Note that each pixel of the HWP 310 will provide the closed loop polarization transformation, for all actuated states (e.g., regardless whether it is switched to $-\pi/4$ or $+\pi/4$). As discussed above, this closed loop polarization transformation provides the geometric phase shift used to produce the phase modulation that generates the uncorrelated speckle patterns. With the switching range limited to $\pi/2$, the maximum geometric phase modulation depth obtained by electrically switchable HWP and two co-operating QWPs is $\pi$ ($2\theta=2*\pi/2$ maximum, or $\pi$).

Referring to FIGS. 20(*c*) and 20(*d*), there is shown a despeckle device 300*a* according to another embodiment of the instant invention. In this embodiment, the despeckle device 300*a* includes a near HWP 310*a* made of active LC retarder. The LC retarder includes an in-plane switching (IPS) material 312*a*, such as planar aligned nematic LC, sandwiched between two parallel plates 314*a*, 316*a*. The near half-wave retarder 310*a* is actuatable to have a variable optic axis distribution, which varies as a function of XY location. More specifically, the near half-wave retarder 310*a* includes a plurality of cell partitions or pixels, the slow axis of which is independently controllable. The plurality of LC pixels is patterned to provide sub-resolution spot partitions, with respect to the resolution of the detector and/or image forming device (not shown).

An actuator 320*a* is provided to actively vary the slow axis of each LC pixel in a random or predetermined pattern (e.g., to switch the orientation of the slow axis within the plane of the optical retarder) over one detector integration interval. In one embodiment, the actuator 320*a* electronically controls the individual LC pixels by applying a voltage to a plurality of ITO electrodes disposed on the substrate 314*a* and the cover glass 316*a*. More specifically, the actuator 320*a* includes a pixelated transparent electrode structure that defines the LC pixels. For example, in one embodiment the LC is switched via fringe field switching. In another embodiment, the LC is a ferroelectric LC (FLC). In general, the slow axes will be switched between 0 and $\pi$, or between 0 and $-\pi$ (e.g., relative to the linearly polarized input light).

In operation, a laser input beam (e.g., horizontal polarization) passes through the HWP 310*a*. If the LC pixel is actuated to have its slow axis parallel to the horizontal input, then the light passing therethrough will be rotated 180 degrees (e.g., horizontal polarization). If the LC pixel is actuated to have its slow axis perpendicular to the horizontal input, then the light passing therethrough will be rotated 0 degrees (e.g., horizontal polarization). In other words, the binary switching LC axes impose a 0 or π phase modulation, while maintaining the same linear polarization output.

Advantageously, the embodiments discussed with respect to FIGS. 20(a) and 20 (c) do not require mechanical perturbation of the variable HWP, and thus provide a low-noise and compact solution for reducing speckle contrast (e.g., which is very useful for laser-based projectors in embedded portable devices).

Further advantageously, the LC retarders 310, 310a discussed above utilize in-plane switching materials. Accordingly, the LC device modulates the azimuthal angle of the optic axis while keeping the tilt angle fixed at or near 0 degrees from the device plane. This is in contrast to phase-only modulators employing LC retarder materials that operate by modulating the tilt angle of the LC, while keeping the azimuthal angle fixed. In addition to providing the geometric phase shift described above, in-plane switching LC devices also provide faster switching times.

Figure 21A:
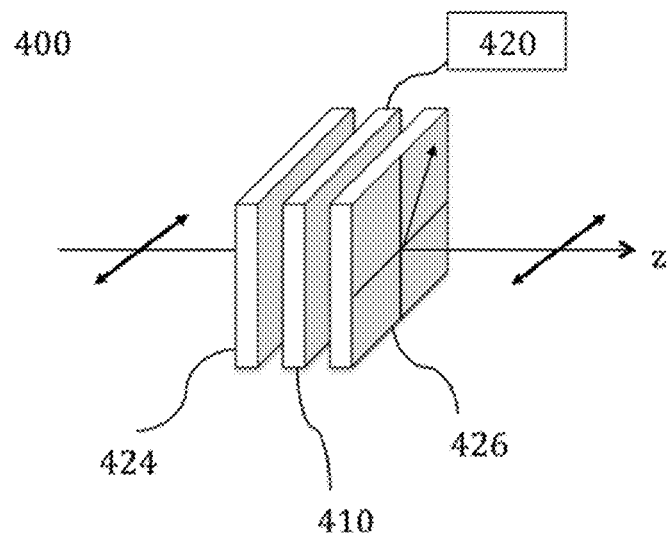
FIG. 21(a) is a schematic diagram of a despeckle device according to one embodiment of the instant invention, including a near HWP having a fixed spatially varied slow axis and two QWPs.
Figure 21B:
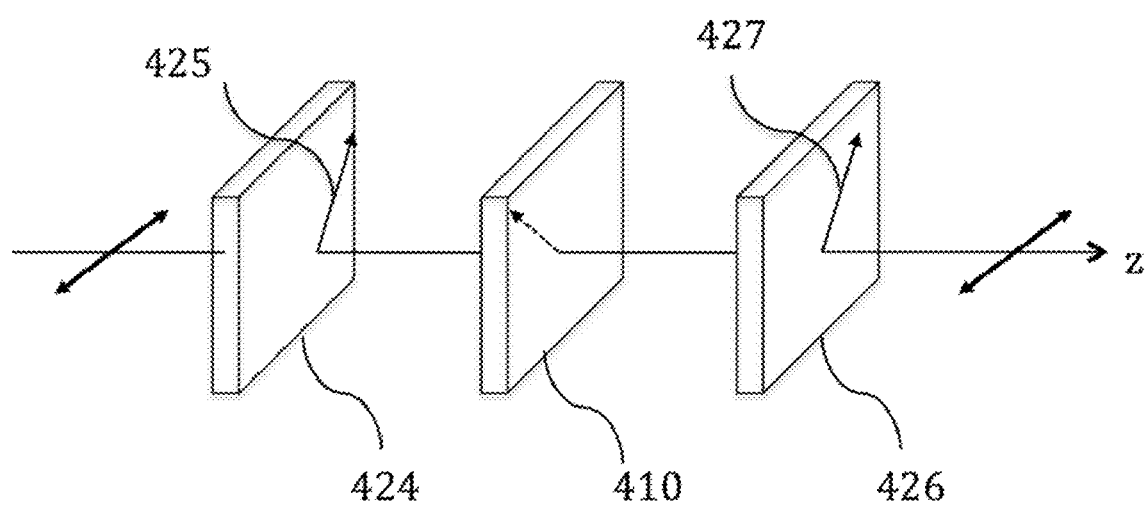
FIG. 21(b) is an exploded view of the despeckle device illustrated in FIG. 21(a) showing the slow axis orientations of the two QWPs.

Referring to FIGS. 21(a) and 21(b), there is shown a despeckle device 400 according to another embodiment of the instant invention. In this embodiment, the despeckle device 400 includes a mechanically perturbed near half-wave retarder 410. More specifically, the despeckle device 400 includes a first QWP (or a multi-layer AQWP) 424 disposed on an input side of the near half-wave retarder 410 with its effective optic axis 425 aligned at π/4 with respect to the linear polarization axis of the input laser light, and a second QWP (or a multi-layer AQWP) 426 disposed on an output side of the near half-have retarder 410 with its effective optic axis 427 also aligned at π/4 with respect to the linear polarization axis of the input laser light. In this embodiment, the near half-wave retarder 410 is a half-waveplate or a multiple-order half-waveplate that provides an odd integer multiple of substantially half-wave retardation (e.g., 1HW, 3HW, 5HW, etc.) at the wavelength of interest. The near half-wave retarder 410 has a spatially varied slow axis, which in one embodiment includes a plurality of slow axis orientations parallel to a surface of the half-wave plate. More specifically, the near half-wave retarder has a slow axis distribution that varies as a function of XY location (e.g., the slow axis orientation varies across the plane of the optical retarder in a predetermined or random pattern). In general, the slow axis variation is designed such that a sub-section of the near half-wave retarder, which is much smaller than the corresponding resolution spot on the despeckle plane, will exhibit a locally uniform retarder axis (e.g., at the microscopic level).

An actuator 420 provides the mechanical perturbation of the near half-waveplate 410, while keeping the QWPs 424, 426 fixed. In one embodiment, the actuator includes a motor for spinning the near half-waveplate about a rotational axis. For example, in the embodiment illustrated in FIG. 21(c) the near HWP 410 is mounted offset from the beam axis. In another embodiment, the actuator includes a piezoelectric actuator for providing a linear translation (i.e., vibrating the near half-waveplate). For example, referring to FIG. 21(d) the actuator 410 may provide one dimensional (1D) or two dimensional (2D) translation. Advantageously, a despeckle device including an actuator providing 1D or 2D linear translation does not require as large a near HWP as a despeckle device including an actuator providing rotational translation. For example, a despeckle device including an actuator providing 1D or 2D linear translation would only require the near HWP to be slightly larger than the illuminated area (e.g., which is about 7×4.4 mm if a conventional lightpipe is used), while that using an actuator providing rotational translation would be more than twice as long.

In operation, a laser input beam (e.g., horizontal polarization) passes through the first QWP 424 where it becomes circularly polarized (e.g., having a first handedness), and then passes through the near HWP 410 and the second QWP 326. If the light passes through a region on the near HWP 410 having a local slow axis orientation close to π/4 or −π/4 (e.g., as illustrated in FIG. 21(b)), then the circularly polarized light will change handedness and be transmitted from the second QWP as linearly polarized light, having a phase shift of π (i.e., closed loop polarization transformation). If the light passes through a region on the near HWP 410 having a local slow axis orientation that is not π/4 or −π/4, then the phase shift will be less than π. In other words, the phase shift depends on the local slow axis orientation. The plurality of local slow axis orientations (e.g., that lie parallel to the surface of the retarder) provides a phase mask that creates a static speckle pattern.

The actuator 420 moves the near HWP 410 such that a sub-section of a cross-section of the laser beam (i.e., which is smaller than a resolution spot on the despeckle plane) will sample different slow axis orientations over a given time interval. In other words, moving (e.g., spinning/vibrating) the near HWP 410 changes the phase shift at each XY site of the illumination cross section over time such that the interference conditions at each sub-pixel resolution spot vary over time. Accordingly, the speckle pattern is varied over time and over the resolution spot. The outcome is reduced speckle contrast as detected within one detector integration interval.

Figure 22A:
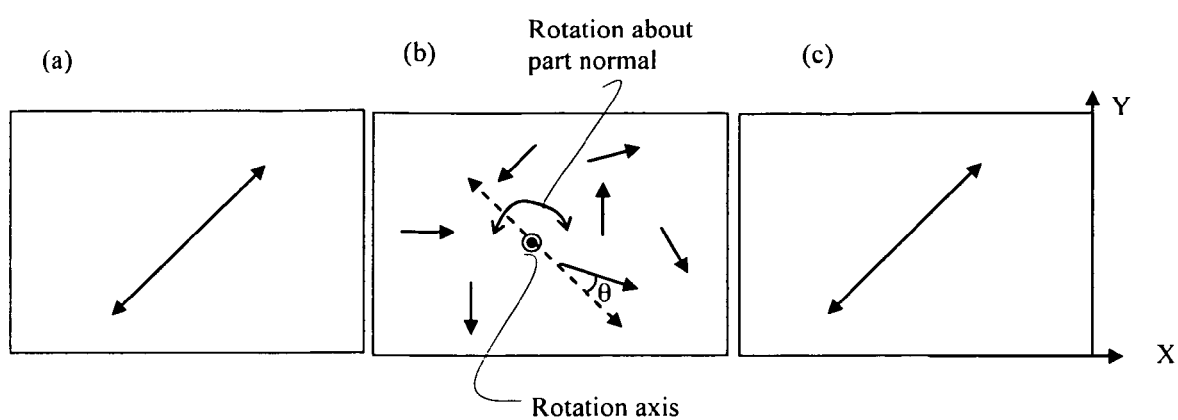
FIG. 22(a) is a schematic diagram illustrating the optic axis orientations of the first, second and third stage waveplate assemblies, when the near HWP includes a LCP.

In one embodiment the near half-waveplate 410 includes a liquid crystal polymer (LCP) having a randomly oriented slow axis distribution, as schematically illustrated in FIG. 22(a). Also shown in the same figure are (a) and (c) diagrams which represent the uniform first and third stage waveplate optic axis orientations. In general, the distribution pattern is designed such that each sub-section (e.g., a XY site) of a cross-section of an incident beam of light in the laser illumination system will sample a locally uniform retarder axis (at the microscopic level), and a substantially homogeneous z-axis.

Figure 22B:
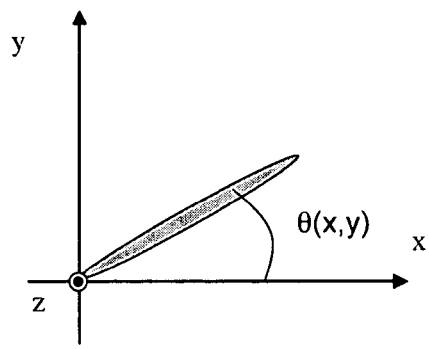
FIG. 22(b) shows the random orientation of a local LCP site.

FIG. 22(b) illustrates the locally uniform retarder axis sampled by part of the beam of light. More specifically, FIG. 22(b) is a LC director diagram for a local LCP site, which is smaller than the resolution spot size of the display system. At a given XY location, the locally aligned LC molecule is oriented at θ(x,y) versus the given device XY coordinate system. Since several adjacent local LCP sites form a resolution spot size of the display system, the near HWP 410 will introduce variable amounts of geometric phase shift into the illumination.

In one embodiment, the near half-waveplate 410 includes a LCP that is fabricated with photo-cured LCP materials as follows. A nematic-type LCP precursor (e.g., ROF-5151, Rolic Technologies, Basel, CH) is coated onto a transmissive or reflective substrate (e.g., glass, polymer, single crystals, etc.). Optionally, the substrate is first coated with a primer layer to promote adhesion and/or wetting of the LCP precursor coating. If the optional primer layer is a linearly polymerizable polymer (LPP) material, it is not employed as an alignment layer. In other words, no rubbing-alignment or photo-alignment process step is used. Alternatively, a random or pseudo-random alignment using an alignment layer is employed. Upon coating the LCP precursor film on the substrate, the LCP material is a liquid crystal in the nematic phase. At the macroscopic level there is no globally preferred orientation (i.e. director orientation), however, at the microscopic level the LCP precursor film will exhibit a slow axis orientation that continuously varies in a random manner in the case where no alignment layer is employed, or following the random or pseudo-random alignment of the alignment layer if an alignment layer is employed. There is finite orientation at all spatial locations, except at numerous singularities (vortices) arising from the spatial variations in orientation over such small spatial dimensions.

While the LCP precursor film is in the liquid state, the spatially varied slow axis orientation at the microscopic scale will constantly fluctuate over time especially if there is no alignment layer provided. To set the film into a solid state the LCP is crosslinked, typically via a UV curing process. This makes the above described microscopically continuously varying orientation and vortices permanent.

To control the scale of orientation variation (average spatial rate of change, or vortex density per unit area) in the LCP film, two approaches have been used:

(Type A) To create a low vortex density, the LCP precursor film is made to have a relatively high solvent content and it is annealed at a temperature close to but less than its nematic-isotropic phase transition. These conditions allow for larger regions of similar orientation to develop, and for some vortices to merge as they encounter each other. After the desired amount of annealing time, the film is quickly crosslinked, or quickly cooled and then crosslinked, to fix the structure. Optionally, the cured film is then post-baked to remove residual solvent.

(Type B) To create a high vortex density, the LCP precursor film is made to have a relatively low solvent content, then it is raised to a temperature above its nematic-isotropic phase transition, where it becomes isotropic. The film is then rapidly cooled back down to ambient temperature. As it cools through the isotropic-nematic phase transition temperature, orientation suddenly develops with a high rate of spatial variation at the microscopic level and there is a high density of vortices. A crosslinking process is applied immediately to make this structure permanent. The cured film is then optionally post-baked to remove residual solvent.

Figure 23:
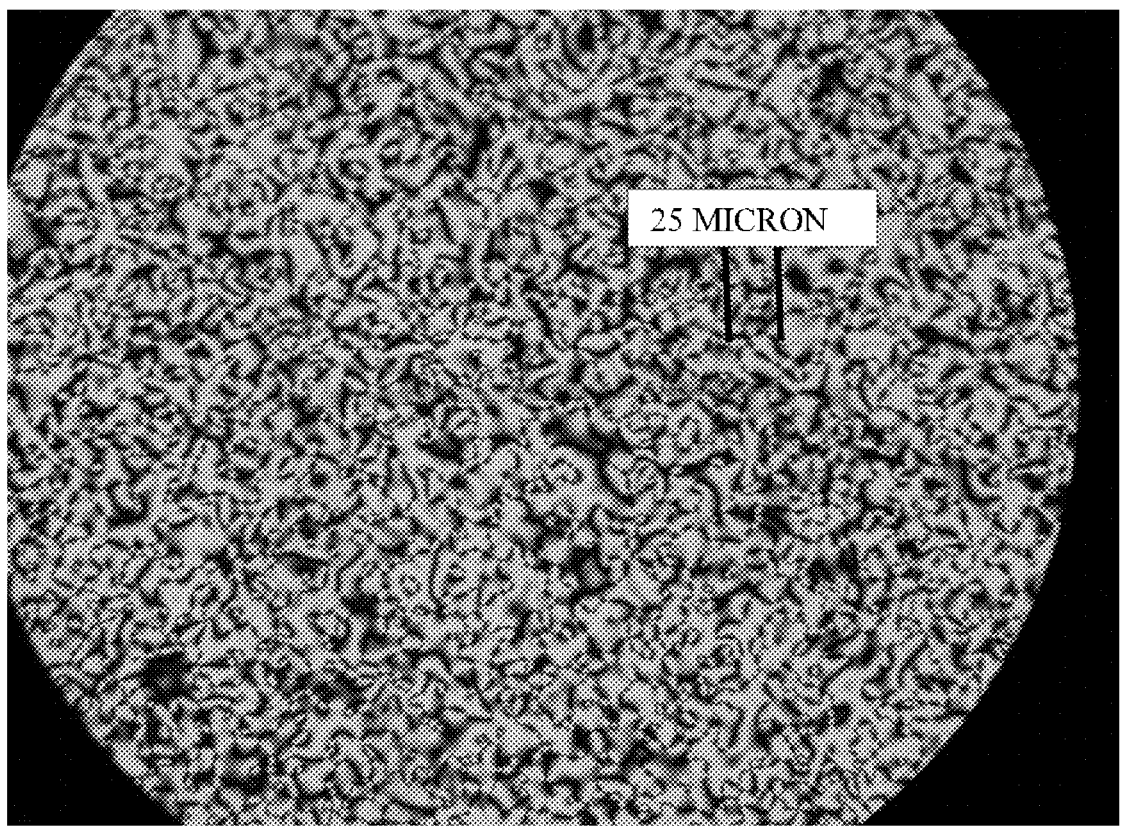
FIG. 23 is a crossed polarizer microscope intensity images of a randomly oriented LCP half-waveplate.

An image of a randomly oriented LCP near half-waveplate (i.e., a non-aligned LCP) having a high vortex density is shown in FIG. 23. The image is a crossed polarizer microscope intensity image with a reticle scale of 1 unit=25 microns. The dark grains correspond to the LCP director aligned parallel to either the polarizer or the crossed axis analyzer. The continuous shading between dark grains represents the continuous LCP director variations. It is clear that the spatially varied slow axis of the non-aligned HWP will provide sub-resolution optical phase modulation to a resolution spot on a detector (e.g., if the display device has a pixel width of about 10 microns). More specifically, the sub-resolution optical phase modulation will provide a sub-resolution intensity variation (e.g., a static speckle pattern) at the detector.

The vortices observed in the films may be described as being m=+1 and m=−1 type vortices, however they are generally distorted. The m=+/−1 nature of the vortices is apparent since there are two opposing dark fringes and two opposing bright fringes emerging from each vortex. The distribution of m=+1 and m=−1 vortices is generally equal and well dispersed. Higher order vortices have not been observed, although conceivably they could exist. One can distinguish between m=+1 and m=−1 by observing which direction the fringes rotate when the sample is rotated between crossed polarizers. Fringe rotation is in the opposite direction of sample rotation for m=+1, and in the same direction as sample rotation for m=−1.

Figure 24:
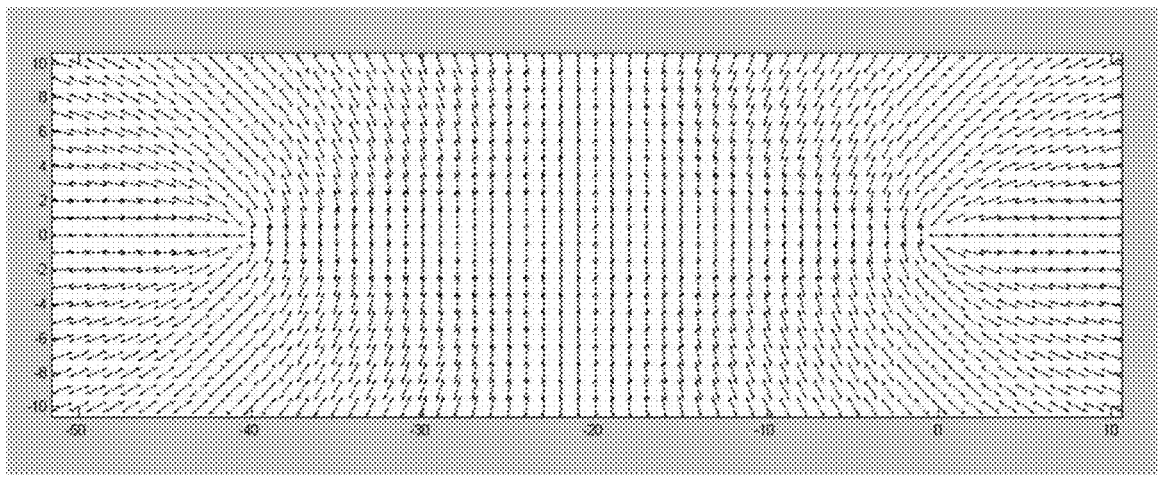
FIG. 24 shows a model of LC director distribution when m=+1 and m=+1 vortices interact.
Figure 25:
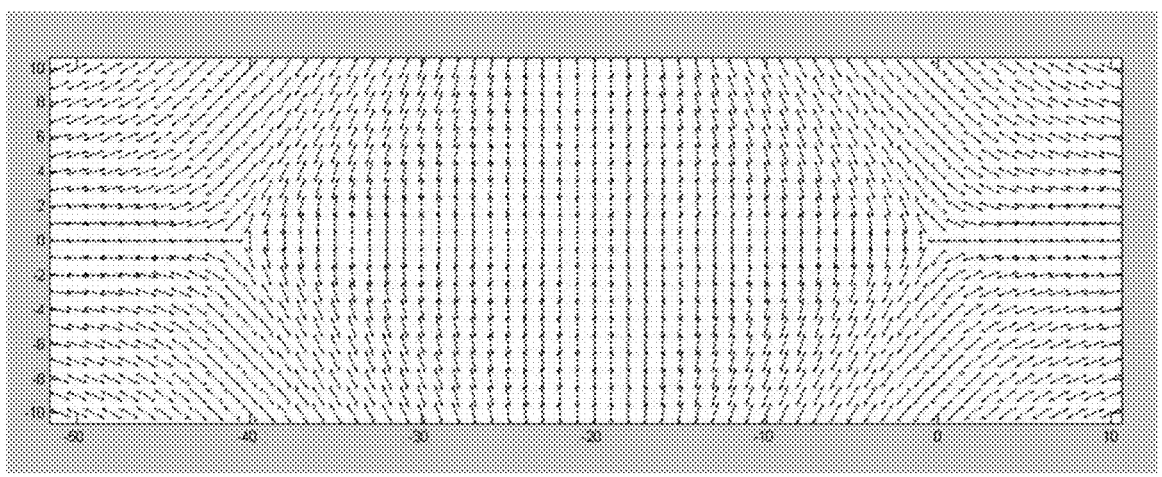
FIG. 25 shows a model of LC director distribution when m=−1 and m=−1 vortices interact.
Figure 26:
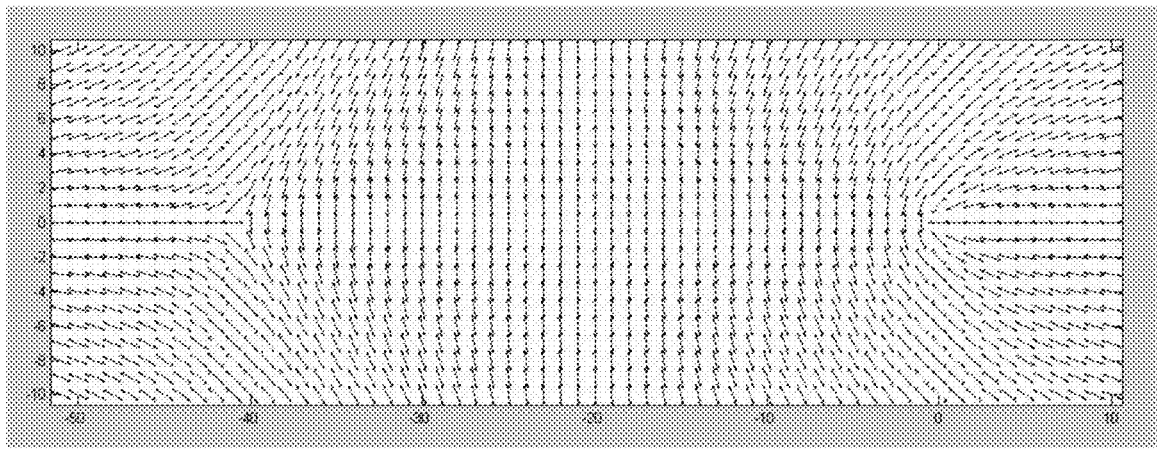
FIG. 26 shows a model of LC director distribution when m=−1 and m=+1 vortices interact.

Several simple mathematical models have been used to depict the orientation distributions of the LCP directors when two vortices interact. The results are shown in FIGS. 24, 25 and 26, which roughly illustrate how the LCP director orientation behaves around two nearby m=+1 vortices, two nearby m=−1 vortices, and nearby m=−1 and m=+1 vortices, respectively.

Advantageously, the above-described unaligned LCP fabrication techniques provide a HWP with spatially varied slow axis, wherein the slow axis variation is continuous rather than discrete. Accordingly, the LCP HWP is not limited by the discrete steps associated with electronically addressed LCs having a transparent pixelated electrode structure and/or prior art diffusers having a textured surface. In addition, since the continuously varying slow axis of the LCP HWP is randomly or pseudo randomly distributed (e.g., the LCP is coated on a randomly aligned or non-aligned alignment layer before being cured), the fabrication does not need to conform to certain targets, and as a result the LCP near HWP is easier to fabricate than prior art diffusers. Moreover, the LCP HWP is less lossy than prior art diffusers having a textured surface.

Further advantageously, the unaligned LCP fabrication technique allows the local slow axes, which lie in the XY plane of the near HWP, to vary on a scale that is much smaller than the equivalent of one resolution spot size of the system (i.e., near where the HWP is inserted). For example, if the near half-waveplate is located close to the microdisplay panel, one resolution spot size would approximately correspond to one LC pixel size. A SVGA and a 1080p microdisplay panel may have less than 10 micron pixel pitch. Note that between one unit of the reticle size in FIG. 23, several complete evolutions of −π/2 to π/2 relative director orientations take place. The reticle size corresponds to about 2 to 3 pixels width in a typical microdisplay panel. That means the phase variable modulation imposed by the variably aligned HWP in conjunction with the optional linear to circular polarization converters occurs at a very small fraction of the pixel width. Since the spatially variable phase mask provided by the LCP HWP has a grain size of much less than a microdisplay pixel, improved speckle reduction is expected.

Further advantageously, the LCP HWP has been found not to scramble the input linear polarized laser light. With regard to the latter, several samples of the high-vortex LCP HWP have been characterized with a Mueller Matrix Polarimeter. In these experiments, a light beam of about 2 mm width was incident at the samples at normal incidence. The full Mueller Matrix data of the samples were collected across a wavelength spectrum.

Figure 27:
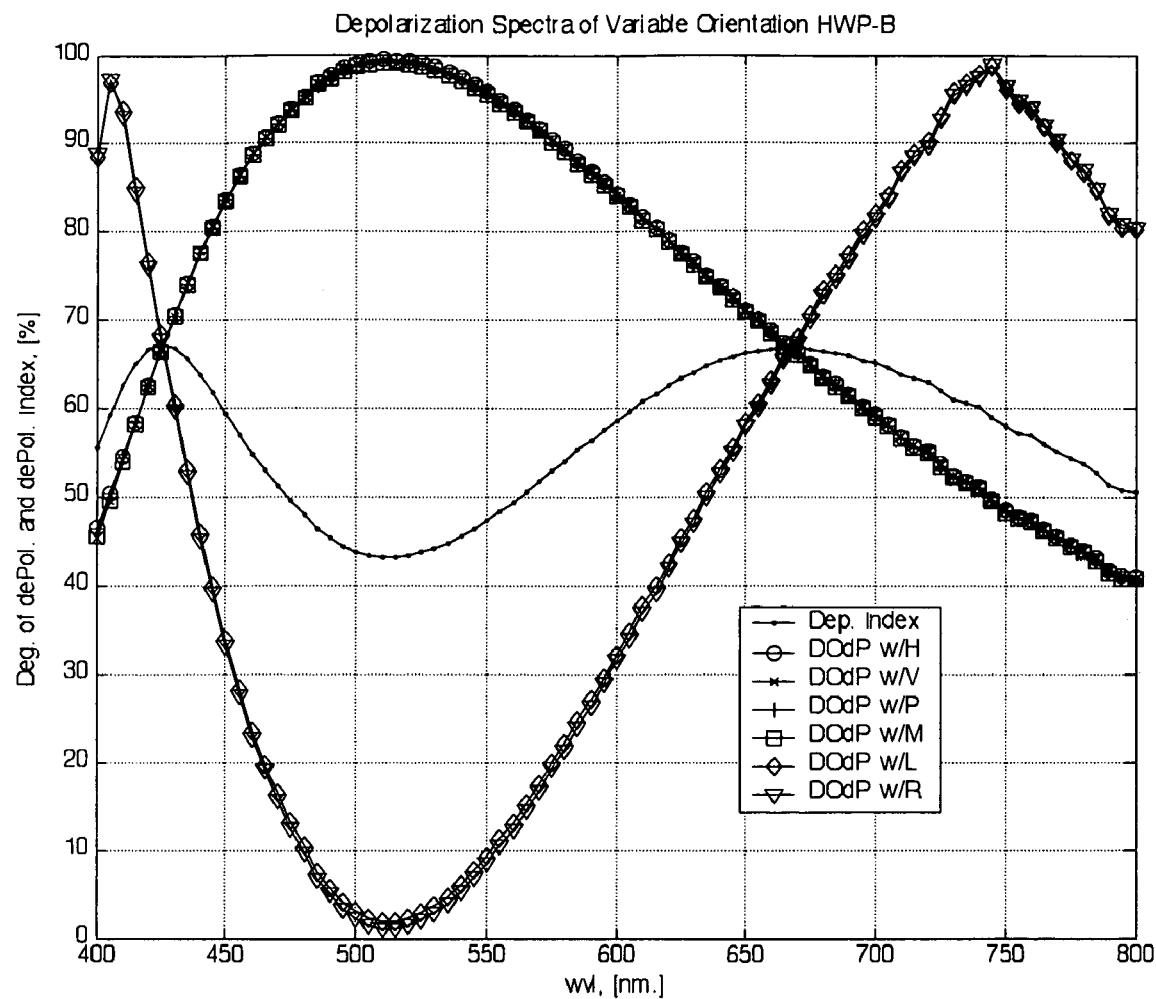
FIG. 27 is a graph showing depolarization spectra of a LCP HWP fabricated using a Type-B process.

Referring to FIG. 27, there is shown a plot of depolarization index as a function of wavelength. The depolarization index (Dep. Index) is defined as follows:

$$Dep(M) = 1 - \frac{\sqrt{\left(\sum_{i,j} m_{ij}^2\right) - m_{00}^2}}{\sqrt{3}\, m_{00}}, \qquad (18)$$

where M is the Mueller matrix of the sample, $m_{ij}$ is the matrix element of M at (i-row, j-column), i and j both range from 0 to 3. In the definition here, a Dep(M) of zero unit equals a non-depolarizing Mueller matrix and one unit equals an ideal depolarizer.

The other plots in FIG. 27 show results of degree of depolarization (DOdP) for a given input polarization. The degree of depolarization is defined as the complement of the degree of polarization of a given Stokes vector S, $$DOP(S) = \sqrt{\sum_{i=1,2,3} S_i} \Big/ S_0 \qquad (19)$$

$$DOdP(S) = 1 - \sqrt{\sum_{i=1,2,3} S_i} \Big/ S_0.$$

In order to calculate the degree of depolarization for several known polarizations, the measured sample Mueller matrix is multiplied with an input Stokes vector. The labels "H", "V", "P", "M", "L" and "R" in the plot correspond to linear horizontal, linear vertical, linear π/4, linear −π/4, left-handed circular and right-handed circular input polarization, respectively. This matrix operation is applied on the collected sample data using the following expressions:

$Sout=M(sample)\times Sin$ $Sin=S_H=[1,1,0,0]^T$ or $S_V=[1,0,0]^T$ or $S_P=[1,0,1,0]^T$ or $S_M=[1,0-1,0]^T$ or $S_L=[1,0,0,1]^T$ or $S_R=[1,0,0,-1]^T$ (20)

In the results shown in FIG. 27, the depolarization index is approximately the average degree of depolarization given that all polarization states exist in the input beam. Note that the fabricated HWP having a spatially varied slow axis shows little to no depolarization for both handedness of circular polarization inputs at the design wavelength. This circular polarization input condition is met in the despeckle device, due to the prior-stage QWP polarization transformation. Accordingly, it has been shown that not only will the LCP HWP preserve the input linear polarization upon closed loop polarization transformation for one ray input, but also will not scramble the input polarization with a bundle of rays illuminating an area of several millimeters in diameter.

In order to demonstrate that a series of phase masks created by spatially varying the HWP optic axis orientation is effective in reducing the perceived speckle noise, a series of numerical modeling was performed. In the baseline system, which includes the despeckle device and the rough screen, the modulation of the illumination by the despeckle device is further modulated by the optical path modulation on the rough screen. In a full projection system, which further includes a display panel, the object wavefront bearing the phase mask of the despeckle device is further modulated in amplitude, phase, polarization or combination thereof at the display panel pixels. This wavefront is then modulated by the phase patterns of the rough screen. The net modulation pattern is projected to the detector. The microdisplay is not expected to be a source of random optical path length modulation of several multiples of the coherent illumination laser wavelength, and hence is not expected to produce speckle. The microdisplay will typically contain grid patterns due to the pixelated structures, which will cause diffraction effects in the projector system utilizing a coherent laser light source. This effect has not been modeled here.

Figure 28A:
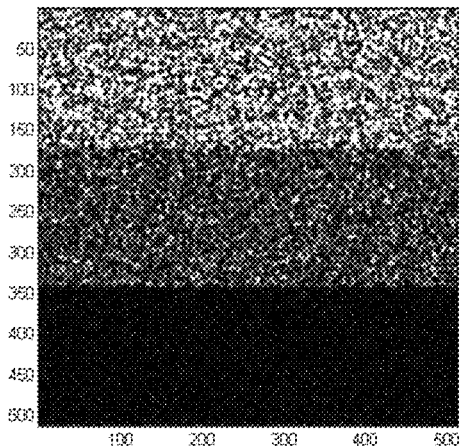
FIG. 28(a) is a detected image showing static rough screen speckle and static despeckle.
Figure 28B:
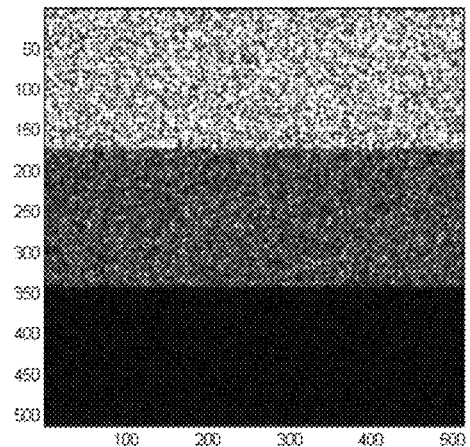
FIG. 28(b) is a detected image showing static rough screen speckle and speckle generated from 10 random phase masks provided by the despeckle device.
Figure 28C:
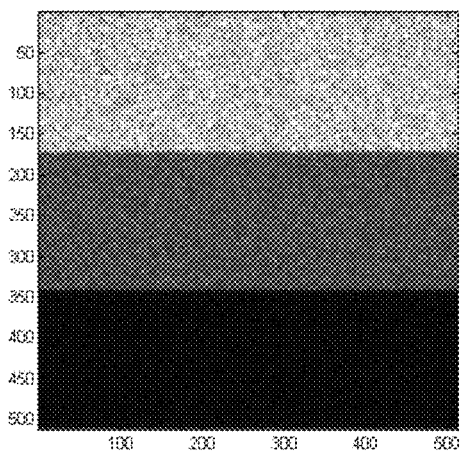
FIG. 28(c) is a detected image showing static rough screen speckle and speckle generated from 100 random phase masks provided by the despeckle device.
Figure 28D:
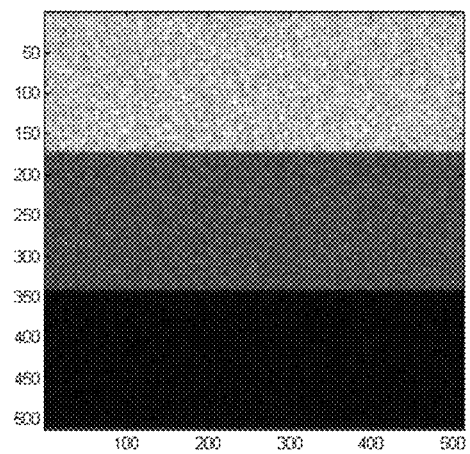
FIG. 28(d) is a detected image showing static rough screen speckle and speckle generated from 160 random phase masks provided by the despeckle device.

The speckle imaging model described earlier was modified to include an additional random phase mask of 512×512 grid points. The modeling assumes a static but random phase mask is contributed by the rough projection screen over the detector integration interval. At each calculation interval, another phase mask is generated, representing the function of the despeckle device. These two masks are multiplied together to yield the effective complex amplitude optical field at the detector. The phase mask is converted to complex amplitude modulation and multiplied with the 3-zone panel modulation. The detected images over the integration interval are shown in FIG. 28(a) to FIG. 28(d) for up to 160 sets of XY random phase modulations by the despeckle device over the integration interval. Referring to FIG. 28(a), it is clear that a static phase mask does not aid in anyway to reduce the perceived speckle after its interaction with the static speckle pattern due to the screen. Referring to FIGS. 28(b), (c), and (d) it is clear that as the number of phase masks is increased from 10, to 100, to 160, respectively, that the speckle grains become smaller and the deviation from the average detected intensity is reduced.

Figure 29:
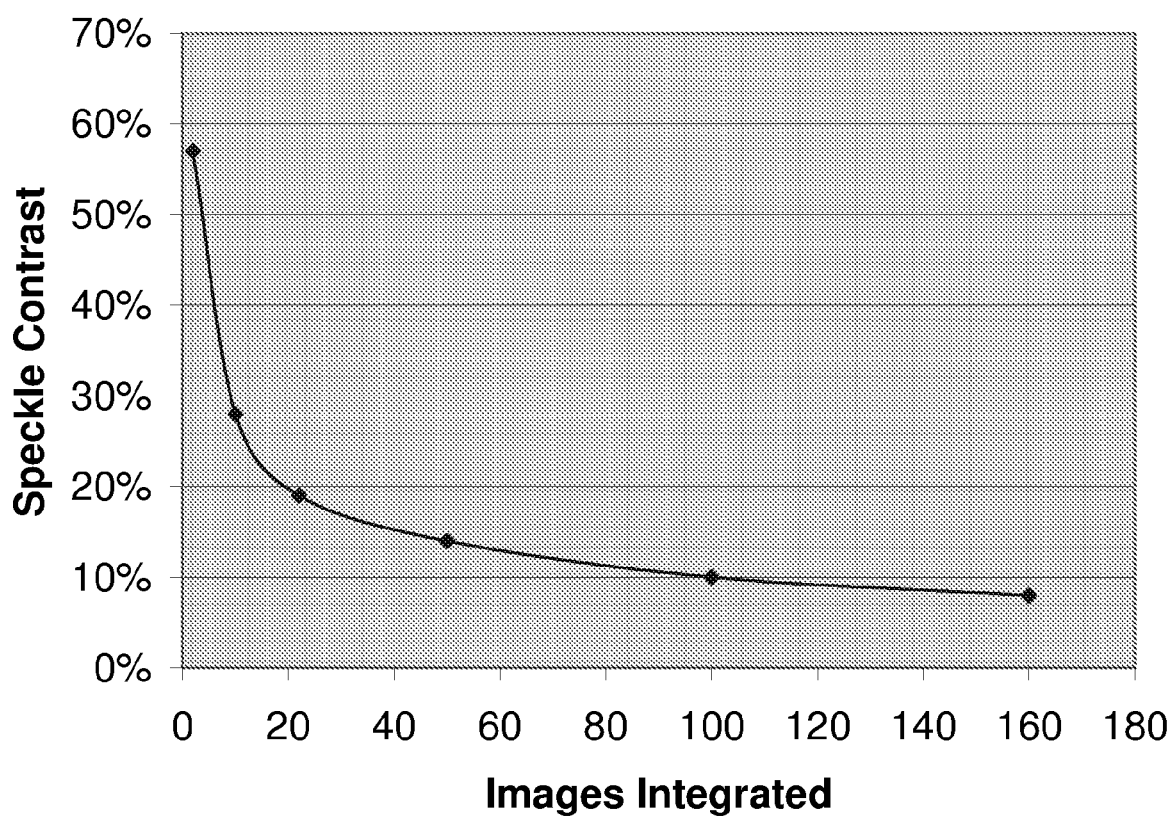
FIG. 29 is a plot of simulated speckle contrast as a function of the number of boiling speckle patterns; and, FIG. 30 is a schematic diagram showing the relationship between partitions of each sub-resolution spot and the display panel pixel size.
Figure 30:
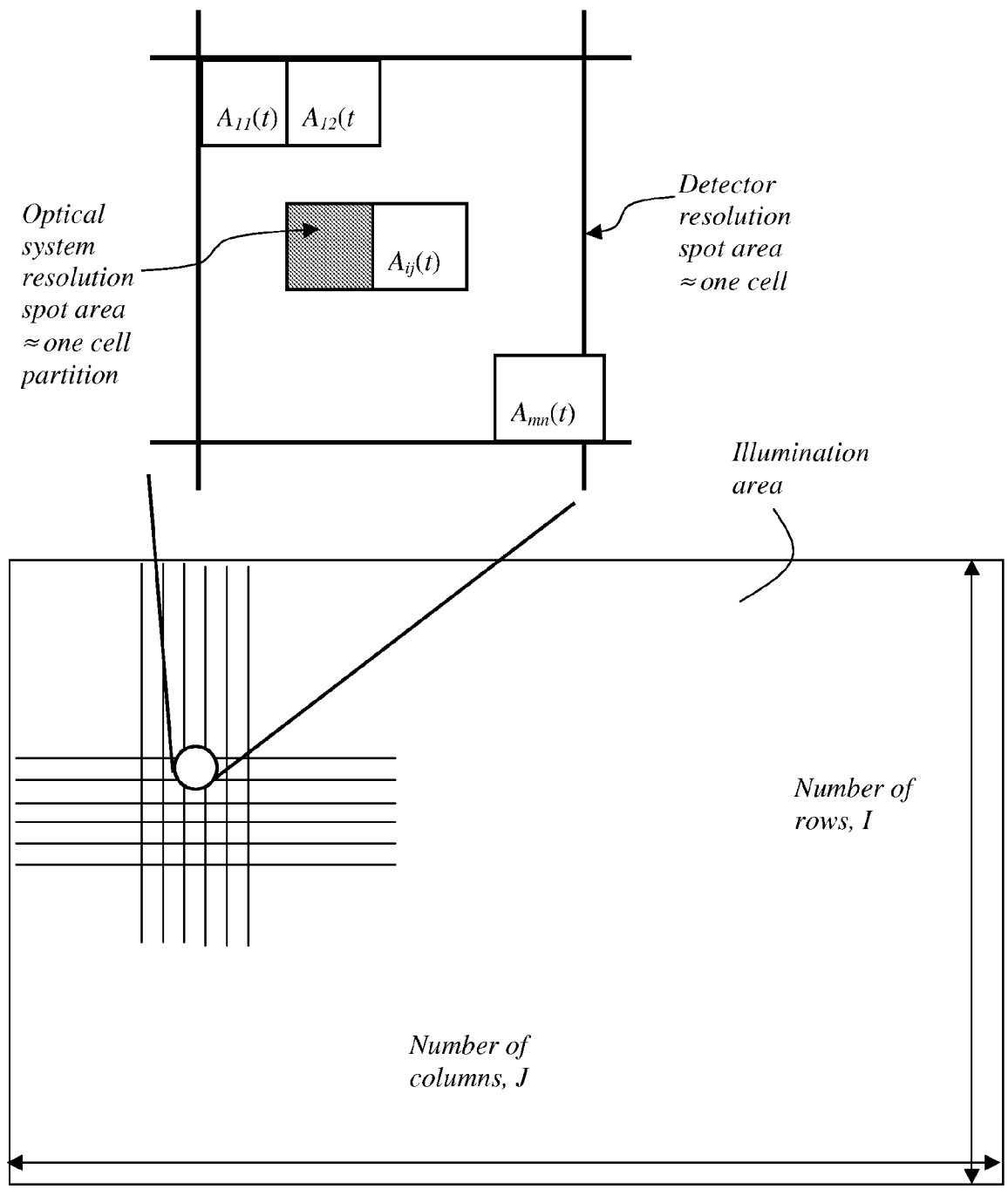

With a random phase mask up to ±π (either using a uniform distribution or a normal (Gaussian) distribution having one σ of π), each resultant instantaneous image yields about 50% speckle contrast ratio. By summing multiple incoherent images, the speckle ratio begins to decrease. The dependence of speckle contrast ratio on the number of speckle images generated is shown in FIG. 29. For each additional image integrated for the first 10 images the decrease in speckle contrast is steep. For additional images integrated after 50 images the speckle contrast begins to level out. Note that for a typical requirement of keeping the ratio<10% and 8%, the model suggests between 100 and 160 completely uncorrelated speckle patterns are required. The number of phase masks increases for the sample perceived speckle ratio if the phase modulations are only partially uncorrelated.

In each of the above described embodiments, the near half-wave retarder having a spatially varied slow axis (e.g., 310, 310a, 410) is fabricated such that the spatially varied slow axis imposes a phase mask on the light passing therethrough. This phase mask, which is used to encode the beam of light with the spatial interference pattern corresponding to the incoherent speckle pattern, typically has a phase cell size (i.e., the size of a distinct area with a constant phase or a locally uniform retarder axis) that is much smaller than the size of a resolution spot of the detector (e.g., square law or human eye) and/or much smaller than a size of a pixel in the display panel. In general, when the HWP retarder having a spatially varied slow axis is electronically addressable, the phase mask will be pixelated, whereas when the HWP retarder having a spatially varied slow axis is LCP based, the phase cells in the phase mask will be randomly distributed and/or irregularly shaped. In each case, the phase mask may provide a continuum of phase shift between 0 and π (e.g., for the electronically addressable HWP the intermediate phase shifts occur during switching, and for the spatially varied slow axis LCP based HWP); or may provide predominately 0 and π phase shifts (e.g., for the electronically addressable HWP with switching time being much less than the dwell time of pixels at end-point states, and where all pixels simultaneously optionally switch at a periodic time interval). In each case, speckle contrast is most reduced if the phase cell size is much smaller than the size of a resolution spot of the laser illumination system (e.g., much smaller than a resolution spot of the detector and/or much smaller than a size of a pixel in the display panel).

In order to assess the resolution spot of the detector, one assumes that the despeckle device is located adjacent to the microdisplay panel. Regardless of the magnification of projection optics, the observer is able typically to discern a pixel of an image modulated by the microdisplay. Most high resolution microdisplay panels of both transmissive and/or reflective types are LC based and yield approximately 5 to 10 pixel pitch. DMD based microdisplays typically possess larger pixel pitches due to the need for micromechanical actuators at each pixel.

Referring to FIG. 31, a footprint of the illuminated area on the despeckle device 140 is divided into fictitious Row×Column resolution of the microdisplay panel. The cross-section of illumination has an imaginary I rows and J columns. The area corresponding to one microdisplay pixel is enlarged to show the required phase partitions. In order to average the boiling speckle patterns, the phase values within each partition should be rapidly varied over the detector integration interval.

In general, the integration time of the human eye is between about 20 ms and 50 ms (e.g., the time for the human eye to detect change is at least 20 ms). Accordingly, if the near HW retarder having a spatially varied slow axis is LC based, then the rapid phase modulation over the detector integration interval is achieved by selecting the electronic switching at an appropriately high rate. If the near HW retarder having a spatially varied slow axis is LCP based, then the rapid phase modulation over the detector integration interval is achieved by translating the near HWP at an appropriate speed.

Figure 21C:
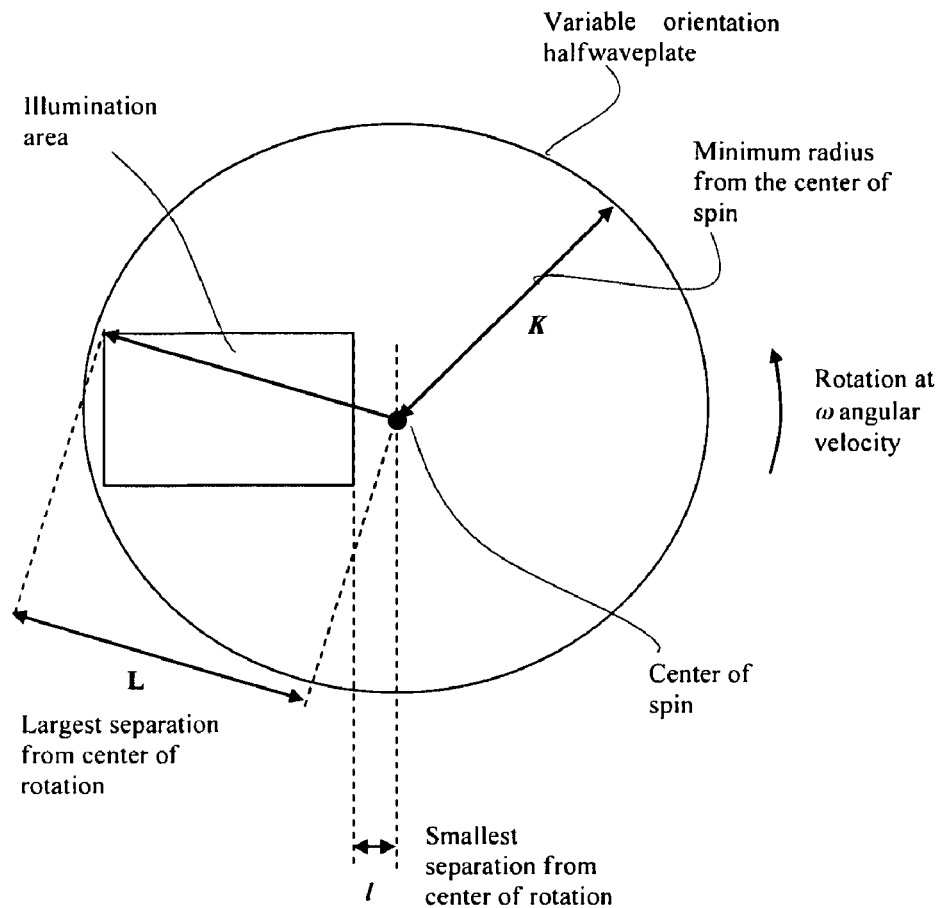
FIG. 21(c) is a schematic diagram illustrating an embodiment of the instant invention wherein the near HWP illustrated in FIG. 21(a) is spun to create variable phase modulation over a detector integration interval.
Figure 21D:
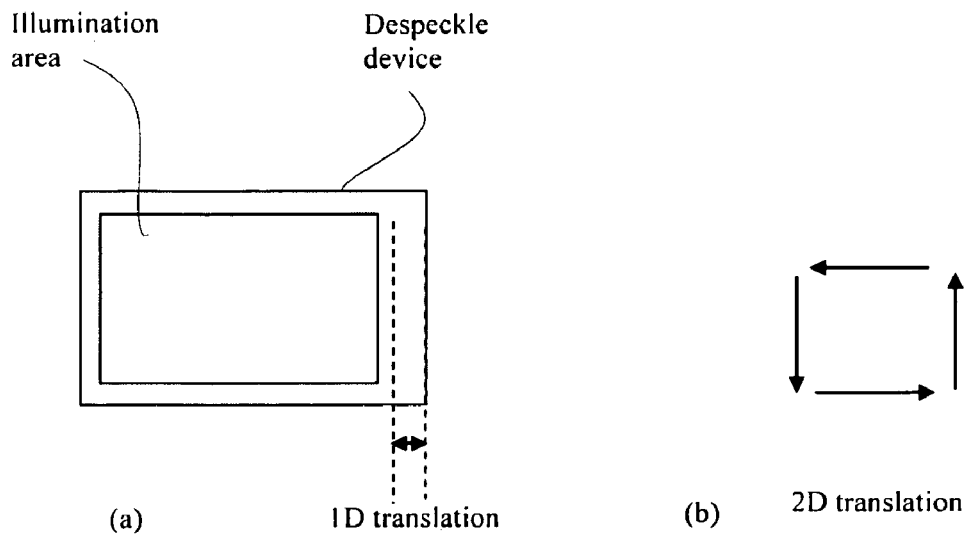
FIG. 21(d) is a schematic diagram illustrating an embodiment of the instant invention wherein the near HWP illustrated in FIG. 21(a) is vibrated to provide 1D (a) or 2D (b) linear translation to create variable phase modulation over a detector integration interval.

For example, consider the rotating near half-waveplate illustrated in FIG. 21(c). In general, the incident coherent beam of light illuminates a small area of the near HWP offset from the rotational axis (e.g., center of spin) such that the closest illuminated edge is a distance l from the rotational axis and such that the furthest illuminated edge is a distance L from the rotational axis, wherein the radius of the clear aperture K of the spinning HWP is longer than L. Assuming that each display pixel pitch, d is equal to 10 microns and that the largest resolution spot on the despeckle device plane is 10 microns, the minimum rotational spin speed can be calculated as follows. If the detector has an integration interval at double rate of 120 Hz (e.g., $\Delta t$ equal to $\frac{1}{120}$s or 8.33 msec), and if 160 sets of phase patterns are averaged within one integration interval to provide a perceived speckle contrast ratio of <8%, the time interval for each phase pattern $\Delta t_1$ will be about 52 μsec. The minimum linear velocity, v, which is calculated from $v=d/\Delta t_1$ is thus equal to 10 μm/52 μsec or 192 mm/sec. Assuming a minimum linear distance from the spindle, l equal to 6 mm, the minimum angular velocity, $\omega=v/l$ will be equal to 192 mm/sec/6 mm or 32 rads/sec. In terms of revolutions per sec (rps), this translates to an angular speed of approximately 5 rps or 306 rpm. Note that the angular velocity may be constant over the entire illuminated area, the local linear velocity is proportional to its distance from the spindle location. If the minimum distance of the illuminated area decreases, the speed has to be increased in order to maintain a required speckle ratio in the detected images.

In accordance with one embodiment of the instant invention, one of the despeckle devices (e.g., 300, 300a, 400) discussed above is used as the despeckle device 140 illustrated in FIG. 1, in order to reduce the speckle effects resulting from the finite aperture and finite integration time of the detector 180. In one embodiment, the despeckle device (e.g., 300, 300a, 400) is inserted in the illumination arm. In another embodiment, the despeckle device (e.g., 300, 300a, 400) is inserted in the projection arm. In general, the near HW retarder having a spatially varied slow axis (e.g., 310, 310a, 410), which generates a spatially variable and/or random phase modulation across the laser illumination plane at the despeckle device, will have a slow axis variation that varies at a much smaller spatial domain size than the equivalent of a resolution spot along a plane where the despeckle device is inserted. If the despeckle device is located in close proximity to the microdisplay panel 150, the resolution spot on the phase modulation plane can be assumed to be approximately the same as a pixel size of the microdisplay panel 150. In this case, the grain size (i.e., one partition or one phase cell) of the near HW retarder having a spatially varied slow axis (e.g., 310, 310a, 410) will be smaller than the pixel size of the microdisplay panel.

In the embodiments discussed with regard to FIGS. 20(a) and 21(a), the despeckle devices 300, 400 are shown to include a first QWP (or a multi-layer AQWP) 324, 424 having its effective optic axis aligned at π/4 with respect to the linear polarization axis of the input laser light, and a second QWP (or a multi-layer AQWP) 326, 426 having its effective optic axis also aligned at π/4 with respect to the linear polarization axis of the input laser light, such that the polarization of the output light is parallel to the polarization of the input light. In other embodiments, the effective optic axis of the second QWP (or multi-layer AQWP) is aligned at −π/4 with respect to the linear polarization axis of the input laser light, such that the polarization of the output light is perpendicular to the polarization of the input light. In other embodiments, the effective optic axis of the second QWP (or multi-layer AQWP) is aligned at some other angle with respect to the linear polarization axis of the input laser light. In each case, the first and second QWPs or AQWPs advantageously preserve the linear polarization of the system, and thus are very useful for increasing the brightness of polarization-based display systems. In other embodiments, the second QWP is omitted. In fact, while the second QWP is useful for embodiments where the display panel is polarization based (e.g., a LCD microdisplay panel) it is less useful if the display panel is not polarization based (e.g., a deformable micromirror device (DMD)).

Of course, the above embodiments have been provided as examples only. It will be appreciated by those of ordinary skill in the art that various modifications, alternate configurations, and/or equivalents will be employed without departing from the spirit and scope of the invention. For example, while the embodiments discussed above were described as including a LC-based near HWP having a spatially varied slow axis (e.g., electronically actuated or LCP), in other embodiments of the instant invention the near HWP having a spatially varied slow axis is based on other birefringent materials. For example, in one embodiment the near HWP having a spatially varied slow axis includes an organic stretched polymer foil or a non-uniform alignment crystal waveplate. In addition, while the near HWPs having a spatially varied slow axis have been described as a single element, it is also within the scope of the instant invention for the near HWP having a spatially varied slow axis to be coupled to other elements. For example, in one embodiment of the instant invention the near HWP and/or the QWPs are coated with a form-birefringent dielectric thin form coating that improves the angular acceptance of the waveplates (e.g., provides a phase retardance that varies as a function of angle of incidence). Accordingly, the scope of the invention is therefore intended to be limited solely by the scope of the appended claims.

The invention claimed is:
1. A method of reducing speckle in a laser illumination system comprising:
    inserting a despeckle device in a beam of light, the beam of light including light emitted from a coherent laser in the laser illumination system, the despeckle device including an optical retarder for providing an odd integer multiple of substantially half-wave retardation for the light emitted from the coherent laser, the optical retarder having a substantially constant retardance and a spatially varied slow axis, the spatially varied slow axis for imposing a phase mask on the beam of light, the phase mask for providing sub-resolution optical phase modulation to a resolution spot on a detector; and actuating the optical retarder such that the sub-resolution optical phase modulation is varied within an integration time of the detector and such that an intensity non-uniformity of one detected resolution spot to another is reduced.

2. A method according to claim 1, wherein actuating the optical retarder includes one of rotating and vibrating the optical retarder such that a sub-section of a cross-section of the beam of light samples a plurality of regions of the phase mask within the integration time of the detector.

3. A method according to claim 1, wherein actuating the optical retarder includes electronically actuating a liquid crystal cell such that local slow axis orientations within the cell rotate within a plane of the cell within the integration time of the detector.

4. An apparatus for reducing speckle in a laser illumination system comprising:

a despeckle device including an optical retarder for providing an odd integer multiple of substantially half-wave retardation for light emitted from a coherent laser in the laser illumination system, the optical retarder having a substantially constant retardance and a spatially varied slow axis, the spatially varied slow axis for imposing a phase mask on a beam of light, the beam of light including the light emitted from the coherent laser, the phase mask for providing sub-resolution optical phase modulation to a resolution spot on a detector; and an actuator for actuating the optical retarder such that the sub-resolution optical phase modulation is varied within an integration time of the detector and such that an intensity non-uniformity of one detected resolution spot to another is reduced.

5. An apparatus according to claim 4, wherein the despeckle device includes a first quarter-waveplate disposed on a first side of the optical retarder for converting the beam of light from linearly polarized light having a first polarization to circularly polarized light having a first handedness, the first quarter-waveplate axes oriented at substantially ±45 degrees with respect to the first polarization.

6. An apparatus according to claim 5, wherein the despeckle device includes a second quarter-waveplate disposed on a second opposite side of the optical retarder for converting circularly polarized light having a second opposite handedness to linearly polarized light having a second polarization, the second quarter-waveplate axes oriented at substantially ±45 degrees with respect to the first polarization, the second polarization being one of perpendicular and parallel to the first polarization, whereby the optical retarder having a spatially varied slow axis converts the circularly polarized light having the first handedness to the circularly polarized light having the second handedness in dependence upon a local slow axis orientation of the optical retarder such that the sub-resolution optical phase modulation is a geometric phase modulation.

7. An apparatus according to claim 6, wherein the first and second quarter-waveplates are achromatic quarter-waveplates.

8. An apparatus according to claim 6, wherein the optical retarder includes a liquid crystal disposed between first and second plates, and wherein the actuator includes a plurality of patterned electrodes for applying a voltage laterally across a region of the liquid crystal, the applied voltage for rotating local slow axis orientations of the liquid crystal in a plane thereof and providing the varied sub-resolution optical phase modulation.

9. An apparatus according to claim 6, wherein the spatially varied slow axis is fixed, and wherein the actuator includes a motor for moving the optical retarder such that a sub-section of a cross-section of the beam of light samples a plurality of regions of the phase mask and provides the varied sub-resolution optical phase modulation.

10. An apparatus according to claim 9, wherein the motor provides one of linear and rotational translation of the optical retarder.

11. An apparatus according to claim 9, wherein the optical retarder includes a liquid crystal polymer.

12. An apparatus according to claim 11, wherein the liquid crystal polymer is coated on one of an un-aligned, randomly aligned, and pseudo-randomly aligned alignment layer.

13. An apparatus according to claim 12, wherein the alignment layer includes a linearly polymerizable polymer.

14. An apparatus according to claim 4, wherein the optical retarder includes a liquid crystal disposed between first and second plates, and wherein the actuator includes a plurality of patterned electrodes for applying a voltage laterally across a region of the liquid crystal, the applied voltage for rotating local slow axis orientations of the liquid crystal in a plane thereof and providing the varied sub-resolution optical phase modulation.

15. An apparatus according to claim 4, wherein the spatially varied slow axis is fixed, and wherein the actuator includes a motor for moving the optical retarder such that a sub-section of a cross-section of the beam of light samples a plurality of regions of the phase mask and provides the varied sub-resolution optical phase modulation.

16. An apparatus according to claim 15, wherein the motor provides one of linear and rotational translation of the optical retarder.

17. An apparatus according to claim 15, wherein the optical retarder includes a liquid crystal polymer.

18. An apparatus according to claim 17, wherein the liquid crystal polymer is coated on one of an un-aligned, randomly aligned, and pseudo-randomly aligned alignment layer.

19. An apparatus according to claim 18, wherein the alignment layer includes a linearly polymerizable polymer.

20. An apparatus according to claim 4, wherein the spatially varied slow axis includes a plurality of slow axis orientations, each slow axis orientation substantially parallel to a plane of the optical retarder.

* * * * *